(12) United States Patent
Iwagami et al.

(10) Patent No.: US 8,321,063 B2
(45) Date of Patent: Nov. 27, 2012

(54) ELECTRONIC CONTROL APPARATUS

(75) Inventors: Yuki Iwagami, Chiyoda-ku (JP); Koji Hashimoto, Chiyoda-ku (JP); Manabu Yamashita, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 321 days.

(21) Appl. No.: 12/873,727

(22) Filed: Sep. 1, 2010

(65) Prior Publication Data
US 2011/0190957 A1    Aug. 4, 2011

(30) Foreign Application Priority Data
Feb. 4, 2010    (JP) ................................. 2010-023076

(51) Int. Cl.
G06F 1/28    (2006.01)
(52) U.S. Cl. ............................ 700/293; 324/140; 714/48
(58) Field of Classification Search .................. 700/293, 700/292, 286; 324/140–142; 714/48
See application file for complete search history.

(56) References Cited

U.S. PATENT DOCUMENTS

| | | | | |
|---|---|---|---|---|
| 5,943,318 | A * | 8/1999 | Badiee | 370/248 |
| 7,020,165 | B2 * | 3/2006 | Rakib et al. | 370/485 |
| 7,079,812 | B2 * | 7/2006 | Miller et al. | 455/63.1 |
| 7,107,488 | B2 | 9/2006 | Hashimoto et al. | |
| 7,343,509 | B2 | 3/2008 | Sayama et al. | |
| 7,653,031 | B2 * | 1/2010 | Godfrey | 370/338 |
| 2005/0026635 | A2 * | 2/2005 | Michaels et al. | 455/466 |

FOREIGN PATENT DOCUMENTS
JP    2005-031865 A    2/2005
JP    2005-299517 A    10/2005
* cited by examiner Primary Examiner — Kidest Bahta
(74) Attorney, Agent, or Firm — Sughrue Mion, PLLC

(57) ABSTRACT

An electronic control apparatus is provided in which a supervisory control circuit part capable of mutual communication with a main control circuit part, which is operated by a high speed clock signal of high precision, is operated by a medium speed clock signal, which is low in cost and precision, such that they can operate mutually independently of each other. The main control circuit part supplies a medium speed communication synchronization signal frequency divided to the supervisory control circuit part. The supervisory control circuit part is operated by the medium speed clock signal to supervise the control operation of the main control circuit part. An error measuring circuit calculates an error correction coefficient which is the ratio of the signal cycle of the communication synchronization signal to that of the medium speed clock signal. The value of the error correction coefficient is reversely supervised by the main control circuit part.

12 Claims, 15 Drawing Sheets

ALT:    ALTERNATING SIGNAL (COMMUNICATION PERMISSION SIGNAL)
CLK0:   HIGH SPEED CLOCK SIGNAL
CLK1:   COMMUNICATION SYNCHRONIZATION SIGNAL
CLK2:   MEDIUM SPEED CLOCK SIGNAL
UPD:    UPSTREAM TRAFFIC INFORMATION
DND:    DOWNSTREAM TRAFFIC INFORMATION

ALT: ALTERNATING SIGNAL (COMMUNICATION PERMISSION SIGNAL)
CLK0: HIGH SPEED CLOCK SIGNAL
CLK1: COMMUNICATION SYNCHRONIZATION SIGNAL
CLK2: MEDIUM SPEED CLOCK SIGNAL
UPD: UPSTREAM TRAFFIC INFORMATION
DND: DOWNSTREAM TRAFFIC INFORMATION

Kn: ERROR CORRECTION COEFFICIENT
N1A: READ-OUT STORED VALUE

PMT: LOGIC SIGNAL (COMMUNICATION PERMISSION SIGNAL)

ELECTRONIC CONTROL APPARATUS

BACKGROUND OF THE INVENTION

1. Field of the Invention

The present invention relates to an electronic control apparatus having a supervisory control circuit, which is applicable to a vehicle mounted engine control system, etc., and in particular to an improved technique of an electronic control apparatus which has an inexpensive supervisory control circuit part of a medium speed operation connected in series to a main control circuit part that is provided with a microprocessor of high performance operating at high speed.

2. Description of the Related Art

In the past, as an electronic control apparatus having a supervisory control circuit, there has been proposed a technique in which a supervisory control circuit part is formed to be mutually connected in series to a main control circuit part composed of a microprocessor so as to mutually supervise their operations (for example, see a first patent document).

In the conventional apparatus described in the above-mentioned first patent document, it is constructed such that the supervisory control circuit part transmits through reference packets a lot of questionnaires in a sequential manner to the microprocessor, which constitutes the main control circuit part and performs an input and output control operation, and makes an abnormality determination with respect to the control operation of the microprocessor by making a comparison between the content of a response from the microprocessor and the correct answer information beforehand stored at a supervisory control circuit side, and the microprocessor reversely supervises the supervisory operation of the supervisory control circuit part by diagnosing the receiving interval of the reference packets.

Here, note that in cases where the supervisory control circuit part is operated by frequency dividing a highly precise clock signal used in the main control circuit part, there is a problem that when this clock signal becomes abnormal, both the main control circuit part and the supervisory control circuit part also become abnormal at the same time, so it is desirable to use an inexpensive oscillator, independently of the main control circuit part, as an oscillator for the clock signal by means of which the supervisory control circuit part is driven to operate.

On the other hand, in the past, there has also been proposed a vehicle mounted electronic control apparatus which corrects the period or cycle of a clock signal of low precision used in a supervisory control circuit part by the use of a highly precise reference clock signal supplied from a main control circuit part (for example, see a second patent document).

In the vehicle mounted electronic control apparatus described in the above-mentioned second patent document, there is disclosed a technique which is provided with an awakening control circuit part (corresponding to the supervisory control circuit part) that is connected in series to a microprocessor forming the main control circuit part, wherein the operating cycle of the clock signal of low precision used in the awakening control circuit part is corrected by the highly precise reference clock signal that is obtained by performing frequency division of the highly precise clock signal which is operating at high speed and is used in the main control circuit part, and the time elapsed after the operation of the main control circuit part is stopped is measured by the awakening control circuit part, so that the main control circuit part is reactivated or restarted after a predetermined period of time.

PRIOR ART REFERENCES

Patent Documents

[First Patent Document] Japanese patent application laid-open No. 2005-031865 (FIG. 1, Abstract)
[Second Patent Document] Japanese patent application laid-open No. 2005-299517 (FIG. 1, Abstract)

SUMMARY OF THE INVENTION

In the electronic control apparatus described in the above-mentioned first patent document, it is necessary to perform a timeout check for the supervisory control circuit part to determine the delay of reply information from the main control circuit part, and it is also necessary to make the electronic control apparatus operate by means of a clock signal of relatively high precision in order to set the interval of communication for transmitting question information at a prescribed period or cycle. As a result, there has been a problem that it is unable to use an inexpensive semiconductor oscillator of which the oscillation cycle is liable to change severalfold in accordance with the change of an individual variation, an environmental temperature, and so on, thus making it impossible to suppress an increase in the cost of manufacture.

In the vehicle mounted electronic control apparatus described in the above-mentioned second patent document, the signal cycle of the low precision clock signal used in the awakening control circuit part is corrected by the reference clock signal supplied from the main control circuit part, but the awakening control circuit part detects an error in the cycle of the high speed clock signal by measuring the cycle of the reference clock signal by the use of the high speed clock signal, and in addition, the reference clock signal is supplied to the awakening control circuit part at all times during the operation of the main control circuit part. In such a construction, there has been a problem that so that the possibility of noise malfunction becomes high due to the use of the high speed clock signal which becomes a noise source, and at the same time, the possibility that the main control circuit part will cause noise malfunction also becomes high due to the fact that the frequency divided signal of the clock signal, which acts to operate the main control circuit part, is always distributed to the awakening control circuit part.

The present invention is made in order to solve the problems as referred to above, and a first object of the present invention is to obtain an electronic control apparatus in which a clock signal source is also arranged to be independently added to a supervisory control circuit part in order to enable the supervisory control circuit part to perform a supervisory operation even if a main clock signal source at the side of a main control circuit part becomes abnormal, whereby an increase in the cost of manufacture as a whole can be suppressed by the use of an inexpensive clock signal source as the added clock signal source even if the added clock signal source is low in precision in which the signal cycle thereof changes to a large extent.

In addition, a second object of the present invention is to obtain an electronic control apparatus in which a medium speed clock signal source, being low in power consumption and noise generation as compared with a high speed clock signal source at the side of the main control circuit part, is utilized as a clock signal source used in the supervisory control circuit part, whereby an abnormality determination in the supervisory control circuit part can be made in an accurate manner by detecting an error in the signal cycle of the medium speed clock signal with the use of a communication synchronization signal supplied from the main control circuit part.

Moreover, a third object of the present invention is to obtain an electronic control apparatus in which the communication synchronization signal obtained by frequency dividing a highly precise, high speed clock signal used in the main control circuit part is made to be a medium speed signal cycle, whereby noise malfunction can be suppressed by avoiding at least the useless flow of the high speed clock signal.

An electronic control apparatus according to the present invention includes a main control circuit part and a supervisory control circuit part mutually connected in series with each other by means of serial parallel converters, wherein a first and a second group of electric loads are driven and controlled in response to the operating states of a first and a second group of input sensors and in response to an input and output control program stored in a program memory. The main control circuit part is provided with a microprocessor that is operated by means of a high speed clock signal, and the program memory that cooperates with the microprocessor, and the main control circuit part periodically transmits downstream traffic information, which includes a driving control signal for the second group of electric loads, a communication synchronization signal which is obtained by frequency dividing the high speed clock signal, and a communication permission signal, to the supervisory control circuit part.

The supervisory control circuit part is provided with a communication control circuit part that is driven to operate by means of a medium speed clock signal which is independent of the high speed clock signal and which is generated by a clock signal generation circuit, and the supervisory control circuit part periodically transmits upstream traffic information including an input supervisory signal, which responds to the operating state of the second group of input sensors, to the main control circuit part from a time point of reception of the communication permission signal.

In addition, the supervisory control circuit part is provided with an error measuring circuit for calculating an error correction coefficient corresponding to an individual variation and a variation over time of the medium speed clock signal by making a relative comparison between a signal cycle of the communication synchronization signal and a signal cycle of the medium speed clock signal in a periodic manner, and the supervisory control circuit part supervises and measures a receiving interval of a specific supervisory signal based on the medium speed clock signal and the error correction coefficient in a periodic manner.

The receiving interval of the specific supervisory signal is a receiving interval of the communication permission signal, or a receiving interval of the downstream traffic information, or a receiving interval of answer information periodically transmitted by downstream traffic information in response to question information periodically transmitted by the upstream traffic information.

Moreover, the supervisory control circuit part transmits reverse supervisory information, which is a calculated result of the error correction coefficient or a measurement result with respect to a clock signal cycle required to calculate the error correction coefficient, to the main control circuit part as a part of the upstream traffic information, and at the same time, generates a second reset pulse for initializing and restarting the main control circuit part at the time when the result of the supervision and measurement of the receiving interval of the specific supervisory signal exceeds a predetermined allowable upper limit value.

According to the present invention, the main control circuit part and the supervisory control circuit part are driven to operate by means of the mutually independent clock signals, so the operating states of the main control circuit part and the supervisory control circuit part can be supervised or reversely supervised in a mutual manner, thereby making it possible to improve safety in operation of the electronic control apparatus as a whole.

In addition, it is not necessary to transmit a high speed clock signal, which becomes a cause of noise generation, to the supervisory control circuit part in a continuous manner, as a result of which even if the medium speed clock signal being added is inexpensive and low in precision, it is possible to perform a delay determination of the specific supervisory signal in a precise manner by the use of the error correction coefficient, thereby making it possible to achieve highly precise supervisory control with inexpensive construction.

BEST MODES FOR CARRYING OUT THE INVENTION

First Embodiment

Figure 1:
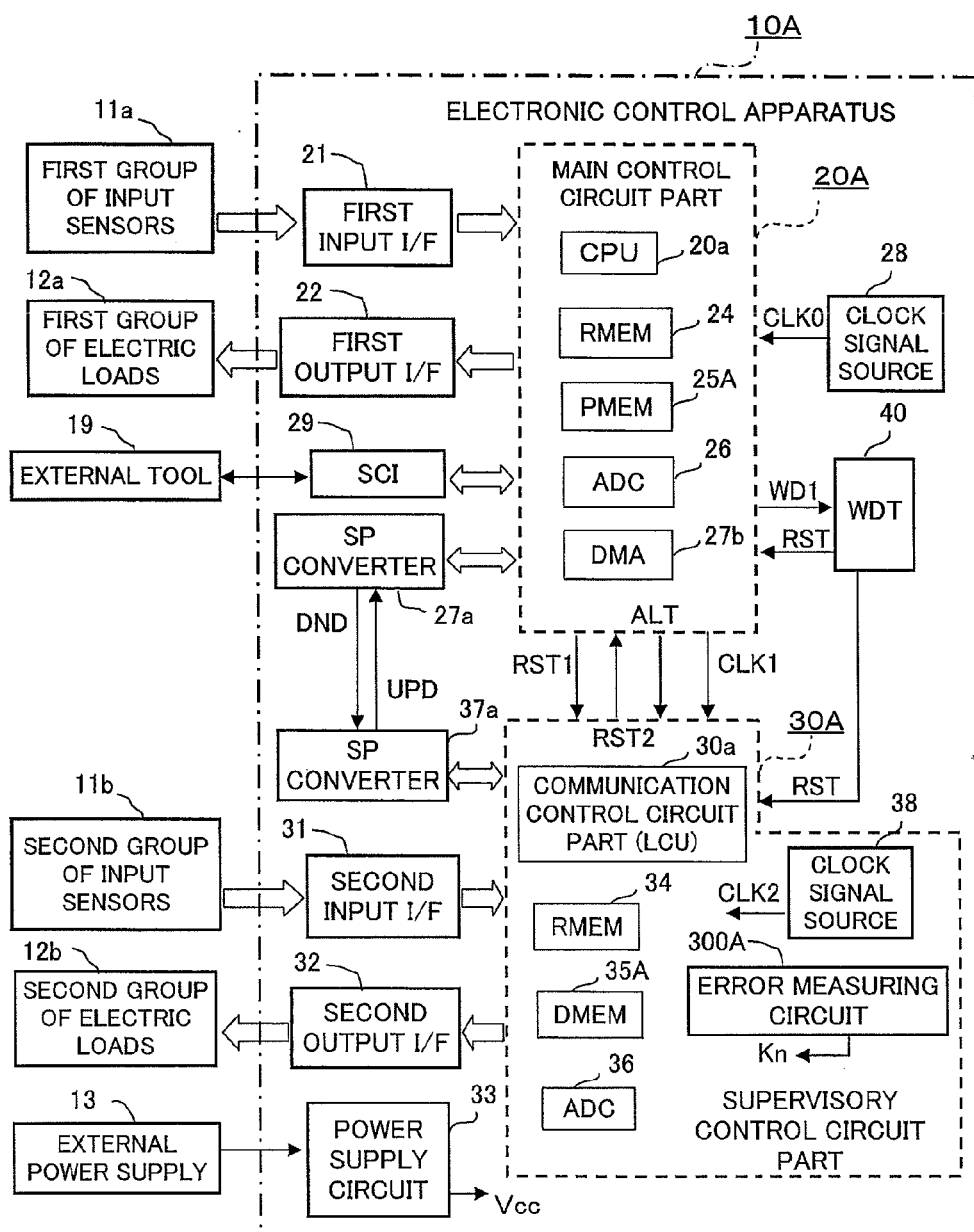
FIG. 1 is a circuit block diagram showing the overall construction of an electronic control apparatus according to a first embodiment of the present invention, together with its related peripheral elements.

Hereinafter, a first embodiment of the present invention will be explained in detail while referring to the accompanying drawings. FIG. 1 is a circuit block diagram showing the overall construction of an electronic control apparatus 10A according to the first embodiment of the present invention, together with its related peripheral elements.

In FIG. 1, the electronic control apparatus 10A is provided with a main control circuit part 20A that is constructed by using a microprocessor (CPU) 20a as a main component, a supervisory control circuit part 30A that is constructed by using a communication control circuit part 30a as a main component, and a power supply circuit 33, wherein when a power supply switch, which is not illustrated, is turned on or made into a closed circuit, electric power is supplied from an external power supply 13 (e.g., a vehicle mounted battery) to a power supply circuit 33 thereby to operate the electronic control apparatus 10A, whereas when the illustrated power supply switch is turned off or made into an open circuit, a power feed circuit from the external power 13 is interrupted after the lapse of a predetermined delay interruption time. Here, note that within the above-mentioned delay interruption period of time, abnormality occurrence history information temporarily stored in a RAM memory to be described later is stored in a program memory 25A to be described later or a nonvolatile data memory which is not illustrated.

In addition, the electronic control apparatus 10A is provided, as circuit elements related to the main control circuit part 20A, with a first input interface circuit 21, a first output interface circuit 22, a serial parallel converter 27a that transmits downstream traffic information DND and receives upstream traffic information UPD, a high precision clock signal source 28, and a serial interface circuit (SCI) 29.

Moreover, the electronic control apparatus 10A is provided, as circuit elements related to the supervisory control circuit part 30A, with a second input interface circuit 31, a second output interface circuit 32, and a series parallel (S/P) converter 37a that transmits upstream traffic information UPD and receives downstream traffic information DND. The pair of serial parallel converters 27a and 37a together constitute a serial communication circuit.

Further, the electronic control apparatus 10A is provided, as circuit elements related to the main control circuit part 20A and the supervisory control circuit part 30A, with a watchdog timer (WDT) 40.

On the other hand, a first and a second group of input sensors 11a, 11b are connected to an outer side of the electronic control apparatus 10A through the first and second input interface circuits 21, 31, respectively, and a first and a second group of electric loads 12a, 12b are connected to the outer side of the electronic control apparatus 10A through the first and second output interface circuits 22, 32, respectively. In addition, an external tool 19 is connected to the outer side of the electronic control apparatus 10A through the serial interface circuit 29. Also, an external power supply 13 is connected to the power supply circuit 33.

The first group of input sensors 11a are comprised of opening and closing sensors or analog sensors for carrying out the driving control of an engine, and include, for example, at least one of an engine rotation sensor or a crank angle sensor for generating a high speed switching signal which performs an ON/OFF operation in synchronization with engine rotation, an accelerator position sensor for detecting the degree of depression of an accelerator pedal, a throttle position sensor for detecting the valve opening degree of an intake air throttle valve, an air flow sensor for detecting the amount of intake air sucked into the engine, and an exhaust gas sensor for detecting the oxygen concentration of an exhaust gas.

The first group of electric loads 12a adapted to be driven by the electronic control apparatus 10A are comprised of electric loads that are operated in conjunction with engine rotation, or electric loads directly related to the driving of the engine, and include, for example, at least one of an electromagnetic valve for fuel injection, an ignition coil (in the case of a gasoline engine), and a motor for controlling the opening and closing of an intake valve.

The second group of input sensors 11b is comprised of opening and closing sensors or analog sensors, and includes, at least one of, for example, operation switches such as a selection switch of a shift lever for speed change gears, an accelerator pedal switch, a brake pedal switch, etc., and analog sensors such as an engine cooling water temperature sensor, an oil pressure sensor, an air pressure sensor, etc.

The second group of electric loads 12b adapted to be driven by the electronic control apparatus 10A are comprised by electric loads of auxiliary equipment or the like which are not directly related to the driving of the engine, and include at least one of a power supply relay for supplying electric power to the electric loads, an electromagnetic clutch for driving an air conditioner, an electromagnetic valve for selecting gear ratios, and alarm indication equipment.

The external tool 19 is connected to the electronic control apparatus 10A through a detachable connector (not shown) at the time of product shipment or maintenance service, so that control programs, control parameters and so on are transferred to and written into the nonvolatile program memory 25A (to be described later) by performing communication with the microprocessor (CPU) 20a through the serial interface circuit 29.

Next, the internal configuration of the electronic control apparatus 10A shown in FIG. 1 will be explained in more detail.

The main control circuit part 20A is provided with a microprocessor (CPU) 20a that becomes a main component, a RAM memory 24 for calculation processing, a program memory (PMEM) 25A (e.g., a nonvolatile flash memory), a multi-channel AD converter 26 for the analog sensors included in the first group of input sensors 11a, and a direct memory access controller 27b for serial communications (hereinafter referred to as a "DMA").

The RAM memory 24, the program memory 25A, the multi-channel AD converter 26 and the DMA 27b are connected to the microprocessor 20a, so that they cooperate with the microprocessor 20a.

The first input interface circuit 21 is inserted between the first group of input sensors 11a and an input port of the microprocessor 20a, and is comprised of a low pass filter for performing the conversion of a signal voltage level and the suppression of signal noise.

The first output interface circuit 22 is inserted between the first group of electric loads 12a and an output port of the microprocessor 20a, and is comprised of a power transistor for driving a variety of kinds of electric loads.

Here, note that a communication control program (to be described later together with FIG. 5 and FIG. 8) in addition to an input and output control program is stored in the program memory 25A.

The supervisory control circuit part 30A is provided with a communication control circuit part 30a (e.g., a logical circuit LCU) that is composed of a hard logic circuit, a RAM memory 34 for calculation processing, a data memory (DMEM) 35A (e.g., a nonvolatile EEPROM), a multi-channel AD converter (ADC) 36 for the analog sensors in the second group of input sensors 11b, a clock signal source 38 that generates a medium speed clock signal CLK2 of low precision for performing a time counting operation, and an error measuring circuit 300A (to be described later together with FIG. 4) that is composed of a hard logic circuit.

The RAM memory 34, the data memory 35A, and the multi-channel AD converter 36 are connected to the communication control circuit part (LCU) 30a, so that they cooperate with the communication control circuit part 30a.

The second input interface circuit 31 is inserted between the second group of input sensors 11b and an input port of the communication control circuit part 30a, and is comprised of a low pass filter for performing the conversion of a signal voltage level and the suppression of signal noise.

The second output interface circuit 32 is inserted between the second group of electric loads 12b and an output port of the communication control circuit part 30a, and is comprised of a power transistor for driving a variety of kinds of electric loads.

Here, note that the communication control circuit part 30a performs communication control (corresponding to flow charts to be described later together with FIG. 6 and FIG. 7), in addition to the communication control of an input output signal, by means of hardware.

The power supply circuit 33 is supplied with electric power from the external power supply 13 thereby to generate a stabilized voltage Vcc (DC 5 V, DC 3.3 V, etc.), so that electric power of the stabilized voltage is supplied to the main control circuit part 20A, the supervisory control circuit part 30A, the individual input and output interface circuits 21, 22, 31 and 32, the clock signal source 28, and the watchdog timer 40 in the electronic control apparatus 10A.

The serial communication circuit comprised of the pair of serial parallel converters 27a, 37a constitutes a full duplex communication circuit, so that it can transmit and receive the downstream traffic information DND from the main control circuit part 20A to the supervisory control circuit part 30A, and the upstream traffic information UPD from the supervisory control circuit part 30A to the main control circuit part 20A in a simultaneous manner.

The microprocessor 20a is driven to operate by means of a high speed clock signal CLK0 (e.g., 10 MHz) which is generated by the high precision clock signal source 28 externally attached thereto, so that it generates a communication synchronization signal CLK1 (e.g., 1 MHz) which is obtained by frequency dividing the high speed clock signal CLK0, and supplies it to the supervisory control circuit part 30A together with a communication permission signal ALT.

The communication permission signal ALT and the communication synchronization signal CLK1 which are generated by the main control circuit part 20A will be described later along with FIG. 2.

The DMA 27b is inserted between a parallel input and output bus of the serial parallel converter 27a, and a data bus of the microprocessor 20a, and it is formed in the main control circuit part 20A so as to perform data transfer between itself and the RAM memory 24 for calculation processing without by way of the microprocessor 20a.

The communication control circuit part 30a is driven to operate by means of the medium speed clock signal CLK2 which is generated by the low precision clock signal source 38. A fluctuation region of the signal cycle T2 of the medium speed clock signal CLK2 is regulated in such a manner that the signal cycle T2 of the medium speed clock signal CLK2 becomes lower in speed and longer in period than that of the communication synchronization signal CLK1, and becomes higher in speed and shorter in period than that of the serial parallel conversion cycle of the serial parallel converters 27a, 37a.

Figure 4:
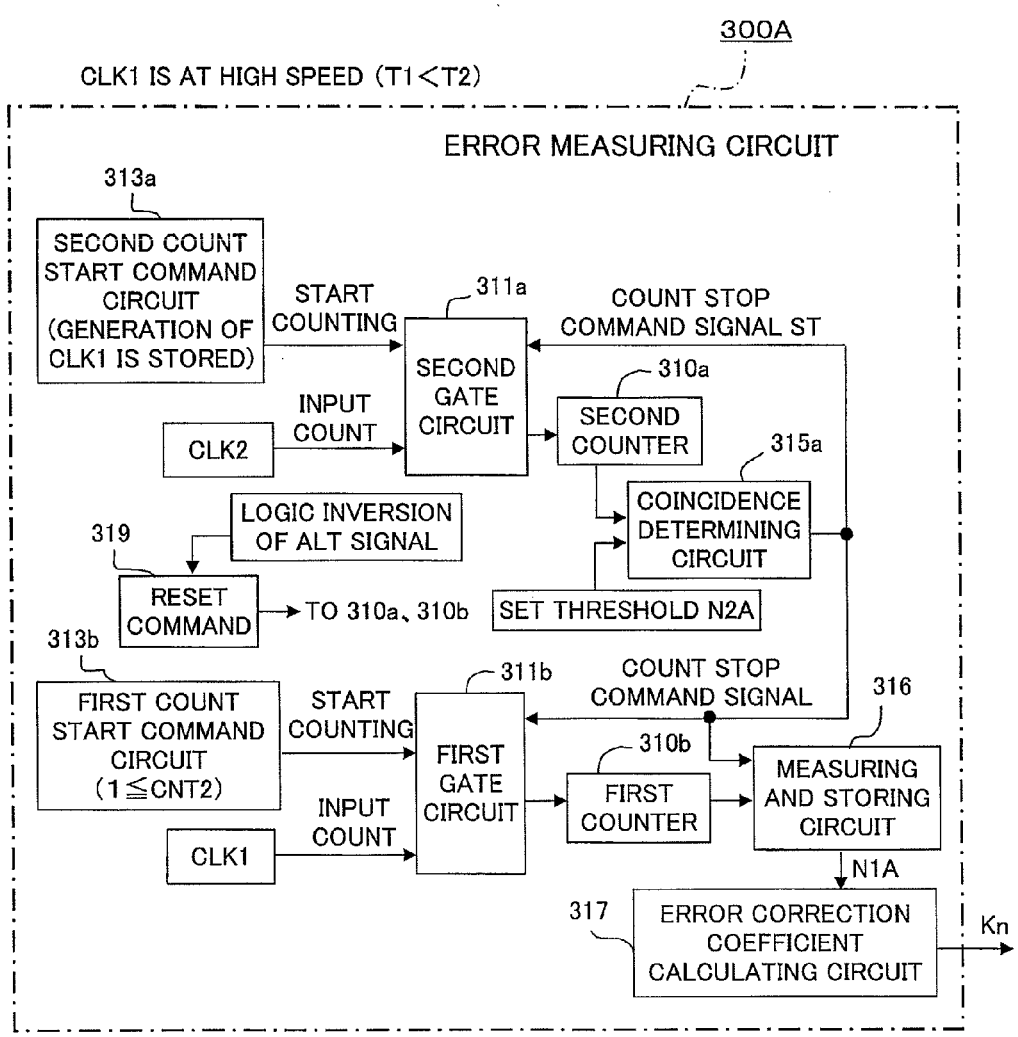
FIG. 4 is a block diagram showing the detailed construction of an error measuring circuit in FIG. 1.

The error measuring circuit 300A in the supervisory control circuit part 30A is a circuit that calculates an error correction coefficient Kn (=T2/T1) by measuring the signal cycle T2 of the medium speed clock signal CLK2 on the basis of a signal cycle T1 of the communication synchronization signal CLK1, as shown in FIG. 4 (to be described later).

The watchdog timer 40 supervises a first watchdog signal WD1 (pulse train) which is generated by the microprocessor 20a, and generates a reset pulse RST when the pulse width of the first watchdog signal WD1 deviates out of the bounds of an allowable fluctuation range, thereby initializing and restarting the main control circuit part 20A and the supervisory control circuit part 30A.

In addition, the main control circuit part 20A initializes and restarts the supervisory control circuit part 30A by means of a first reset pulse RST1 when an abnormality or malfunction of the supervisory control circuit part 30A is detected, and on the other hand, the supervisory control circuit part 30A initializes and restarts the main control circuit part 20A by means of a second reset pulse RST2 when an abnormality or malfunction of the main control circuit part 20A is detected.

Next, reference will be made to a serial communication operation according to the first embodiment of the present invention, as shown in FIG. 1, while referring to a timing chart of FIG. 2 and an explanatory view of FIG. 3.

In FIG. 2(A), the communication permission signal ALT is a signal which permits the main control circuit part 20A to start full duplex block communication, and it is transmitted from the main control circuit part 20A to the supervisory control circuit part 30A through an independent control signal line in a periodic manner.

The communication permission signal ALT is an alternating signal of which the logic level changes at the time of communication permission, as shown in FIG. 2(A), so each time the logic level of the communication permission signal (alternating signal) ALT changes, the start of transmission of a new communication block is permitted.

However, when the fixed logic level of the communication permission signal ALT is maintained, the current communication is completed at the time when communication of a predetermined number of bytes has been completed, and in cases where the logic level of the communication permission signal ALT is inverted before the completion of communication of the predetermined number of bytes, interruption processing of communication data is carried out.

In FIG. 2(B), as the communication synchronization signal CLK1, there are generated a number of pulses corresponding to the number of bits of communication information, which are transmitted from the main control circuit part 20A to the supervisory control circuit part 30A through the independent control signal line.

The communication synchronization signal CLK1 is a pulse train signal for a serial communication signal to carry out stepping movement, and the generation of the communication synchronization signal CLK1 is started after the main control circuit part 20A has generated the communication permission signal ALT, with a delay of a predetermined standby time τ.

The communication synchronization signal CLK1 stops the generation of pulses after generating a predetermined number of pulses corresponding to the number of transmitting and receiving bits, and starts again the generation of pulses with a delay of the standby time τ at the time of generation of the next communication permission signal ALT (at the time of inversion of the signal level). However, in cases where the next communication permission signal ALT is generated as the communication synchronization signal CLK1 at an early stage before the generation of the predetermined number of pulses has been completed, the generation of pulses is started again with a delay of the standby time τ while omitting the generation of the remaining pulses.

In FIG. 2(C), the upstream traffic information UPD includes input signal information with respect to the supervisory control circuit part 30A, or setting constants obtained from the main control circuit part 20A, or report information in the form of stored information of a control output, as well as current question information and code checking information, and has a data length of 500 bits, for example.

In FIG. 2(D), the downstream traffic information DND is transmitted from the main control circuit part 20A to the supervisory control circuit part 30A, and includes command information in the form of setting constants or a control output, which is required in the supervisory control circuit part 30A, answer information to question information which has been obtained from the past upstream traffic information UPD, and code checking information, and has a data length of 100 bits, for example.

Accordingly, in order to transmit and receive all the data, it is necessary to generate at least 500 pulses as the communication synchronization signal CLK1, but the communication permission period or cycle Ta of the communication permission signal ALT is 5 msec, for example, and in contrast thereto, the time required to transmit and receive data of 500 bits is 0.5 msec, for example.

Here, note that tag numbers are given to a plurality of pieces of question information, respectively, which are selected irregularly, and pieces of answer information to the plurality of pieces of question information with the same tag number attached thereto is transmitted to the supervisory control circuit part 30A until a plurality of permitted communication cycles have elapsed.

In addition, the standby time τ is several 100 μsec, and within the standby time τ, an AD conversion command is generated to the multi-channel AD converter 36 and the AD conversion of all the channels has been completed.

Figure 3:
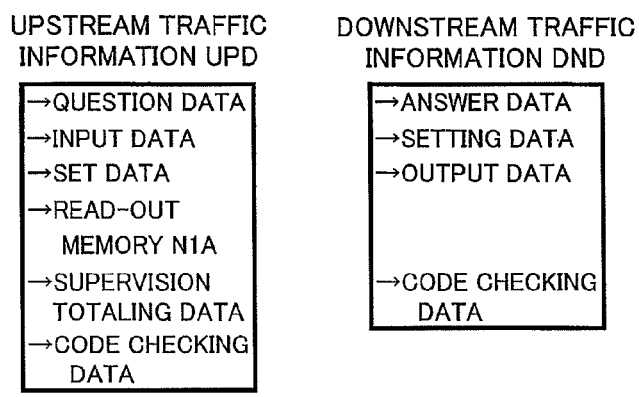
FIG. 3 is an explanatory view showing upstream traffic information and downstream traffic information according to the first embodiment of the present invention.

In FIG. 3, there are shown the specific details of the upstream traffic information UPD and the downstream traffic information DND.

In FIG. 3, the upstream traffic information UPD is the received data which is stored in the RAM memory 24 through upstream communication, and includes question information for Q and A, input signal information obtained from the second group of input sensors 11b, information which has already been set (hereinafter referred to as "set information") to be described later, reverse supervisory information on the calculated result of the error correction coefficient Kn or for calculating the error correction coefficient Kn, supervision totaling information, and code checking information.

Here, note that the value of a read-out stored value N1A (to be described later along with FIG. 4) is transmitted as the reverse supervisory information with respect to the error correction coefficient Kn.

In addition, the downstream traffic information DND is the received data which is stored in the RAM memory 34 through downstream communication, and includes answer information for Q and A, setting information such as control parameters required by the supervisory control circuit part 30A, output signal information with respect to the second group of electric loads 12b, and code checking information.

Here, note that the set information in the upstream traffic information UPD is the setting information (control parameter etc.) and the output signal information which have been stored in the RAM memory 34 as the downstream traffic information DND. By the use of such set information, it can be verified at the side of the main control circuit part 20A whether the setting information and the output signal information have been correctly transmitted.

In the supervisory control circuit part 30A, the correct answer information corresponding to the question information is beforehand stored in the data memory 35A at the stage of product shipping, and the communication control circuit part 30a supervises the operating state of the microprocessor 20a by transmitting question information at random and making a comparison between answer information replied from the microprocessor 20a and correct answer information. In addition, by making an intentional wrong answer to the question information from the communication control circuit part 30a, the microprocessor 20a performs, based on supervision totaling information received, reverse supervision as to whether proper supervisory control is carried out by the supervisory control circuit part 30A.

As a result of this, the supervisory control circuit part 30A initializes and restarts the main control circuit part 20A by generating a second reset pulse RST2 when an abnormality or malfunction of the main control circuit part 20A is detected, and the main control circuit part 20A initializes and restarts the supervisory control circuit part 30A by generating a first reset pulse RST1 when an abnormality or malfunction of the supervisory control circuit part 30A is detected.

Next, reference will be made to the detailed construction of the error measuring circuit 300A in the supervisory control circuit part 30A while referring to a block diagram of FIG. 4 together with FIG. 1 through FIG. 3.

In FIG. 4, the error measuring circuit 300A is provided with a first and a second counter 310b, 310a, a first and a second gate circuit 311b, 311a, a first and a second count start command circuit 313b, 313a, a coincidence determining circuit 315a, a measuring and storing circuit 316, and an error correction coefficient calculating circuit 317

The second counter 310a calculates, through the second gate circuit 311a, the number of times that the medium speed clock signal CLK2 has changed (e.g., from a low logic level "L" to a high logic level "H").

The first counter 310b calculates, through the first gate circuit 311b, the number of times that the communication synchronization signal CLK1 has changed (e.g., from a low logic level "L" to a high logic level "H").

The second count start command circuit 313a stores the fact that the communication synchronization signal CLK1 at the first time has been generated after an effective change of the communication permission signal ALT is carried out, and releases or opens the second gate circuit 311a by means of this stored signal (count start signal), thereby permitting the count of the medium speed clock signal CLK2 to be inputted to the second counter 310a.

The first count start command circuit 313b releases or opens the first gate circuit 311b in response to a time when the current count value CNT2 of the second counter 310a has become equal to or more than 1 ($1 \leq CNT2$), thereby permitting the count of the communication synchronization signal CLK1 to be inputted to the first counter 310b.

The coincidence determining circuit 315a generates a count stop command signal ST thereby to stop the counting operations of the first and second counters 310b, 310a at the time when the current count value CNT2 of the second counter 310a reaches a predetermined set threshold N2A.

The measuring and storing circuit 316 stores, as the read-out stored value N1A, the current count value CNT1 of the first counter 310b at the time when the coincidence determining circuit 315a generates the count stop command signal ST.

The error correction coefficient calculating circuit 317 calculates a ratio (T2/T1) of the signal cycle T2 of the medium speed clock signal CLK2 to the signal cycle T1 of the communication synchronization signal CLK1 as the error correction coefficient Kn by the use of the read-out stored value N1A and the set threshold N2A, as shown in the following equation (1)

$$Kn = T2/T1 = N1A/(N2A-1) \quad (1)$$

Here, note that the number or frequency of generation of the communication synchronization signal CLK1 within a period of time "(N2A−1)×T2" in which the current count value CNT2 of the second counter 310a is "1 to N2A" corresponds to the read-out stored value N1A, so the following relation holds.

$$(N2A-1) \times T2 \approx N1A \times T1$$

Accordingly, the error correction coefficient Kn is calculated by the equation (1).

Each time the communication permission signal ALT is inverted in logic level, the current count values CNT1, CNT2 of the first and second counters 310b, 310a are initialized to a current count value "0" by means of a reset command 319, so that the calculation of the error correction coefficient Kn is freshly carried out.

On the other side, the time counting operation of the supervisory control circuit part 30A is performed by counting the frequency of generation of the medium speed clock signal CLK2.

For example, in cases where first answer information is received after the lapse of a plurality of communication cycles after the transmission of the first question information, the supervisory control circuit part 30A counts the frequency of generation of the medium speed clock signal CLK2 in order to determine whether the time elapsed during this period of time has exceeded a permitted timeout determination time Td (i.e., abnormal).

At this time, if a count value N until the reception of a reply fulfills a relation of N×T2<Td (i.e., N<Td/T2), it means that the reply has been obtained within a predetermined time, and it is determined that a reception state is normal.

However, the signal cycle (communication cycle or period) T2 of the medium speed clock signal CLK2 is greatly changed or fluctuated due to the change of an individual variation and an environmental temperature, so correction is carried out by the use of the signal cycle T1 of the high precision communication synchronization signal CLK1 and the error correction coefficient Kn, as shown in the following equation (2).

$$N < Td/T2 = Td/(Kn \times T1) \quad (2)$$

On the other hand, it is verified by both of the main control circuit part 20A and the supervisory control circuit part 30A whether the error correction coefficient Kn is a value (abnormal) which deviates from an assumed variation range.

First, in cases where the verification is carried out at the side of the main control circuit part 20A, the value of the error correction coefficient Kn calculated by the error correction coefficient calculating circuit 317 in the error measuring circuit 300A of the supervisory control circuit part 30A is transmitted as a part of the upstream traffic information UPD to the main control circuit part 20A through the serial parallel converter 37a and the serial parallel converter 27a, and in the main control circuit part 20A, it is determined whether the error correction coefficient Kn is out of a predetermined range of permission bound pair values (malfunction).

Alternatively, the read-out stored value N1A written in the measuring and storing circuit 316 in the error measuring circuit 300A is transmitted to the main control circuit part 20A, where the equation (1) is calculated by means of the main control circuit part 20A, whereby a determination can also be made as to whether the error correction coefficient Kn has been a value out of the predetermined range (allowable fluctuation range).

Here, note that the value of the error correction coefficient Kn becomes abnormal in cases where the signal cycle (communication cycle) T1 of the communication synchronization signal CLK1 is abnormal, or in cases where the signal cycle T2 of the medium speed clock signal CLK2 is abnormal, but in cases where the high speed clock signal CLK0 on which the communication synchronization signal CLK1 is based becomes abnormal, the detection of a malfunction can also be made by the watchdog timer 40.

Accordingly, first of all, the communication synchronization signal CLK1 is regarded as being normal, and if the value of the error correction coefficient Kn is abnormal, the supervisory control circuit part 30A is initialized and restarted by the first reset pulse RST1 which is generated by the main control circuit part 20A.

However, assuming that the communication synchronization signal CLK1 becomes abnormal and normal communication is impossible, a determination is made at the side of the supervisory control circuit part 30A as to whether the value of the error correction coefficient Kn is normal, and if an abnormal state continues, the second reset pulse RST2 is generated so that the main control circuit part 20A is thereby initialized and restarted.

In the following, a communication operation according to the first embodiment (FIG. 1) of the present invention will be explained.

In FIG. 1, first of all, when the external power supply 13 is connected to the electronic control apparatus 10A through a power supply switch (not shown), the microprocessor 20a in the main control circuit part 20A performs driving control of the first and second group of electric loads 12a, 12b in response to the operating states of the first and second group of input sensors 11a, 11b and the contents of the control program in the program memory 25A.

The control operation of the main control circuit part 20A is supervised by both of the supervisory control circuit part 30A and the watchdog timer 40, so that even if there occurs an abnormality or malfunction in which the pulse width of the first watchdog signal WD1 generated by the microprocessor 20a in the main control circuit part 20A is excessively large or small, the main control circuit part 20A and the supervisory control circuit part 30A are initialized and restarted by the reset pulse RST which is generated by the watchdog timer 40.

In addition, the supervisory control circuit part 30A generates the second reset pulse RST2 for initializing and restarting the main control circuit part 20A, when the supervision and measurement result of the receiving interval of a specific supervisory signal (answer information, etc.), which is periodically transmitted by the downstream traffic information DND in response to the question information periodically transmitted by the communication permission signal ALT, the downstream traffic information DND, or the upstream traffic information UPD, exceeds a predetermined allowable upper limit.

Also, the supervisory control circuit part 30A generates the second reset pulse RST2 for initializing and restarting the main control circuit part 20A, when an abnormal state in which the calculated result of the error correction coefficient Kn with respect to the signal cycle T2 of the medium speed clock signal CLK2 becomes out of a predetermined range of allowable upper and lower limit values continues beyond a predetermined time.

Moreover, by transmitting question information to the main control circuit part 20A and at the same time making a comparison between correct answer information corresponding to this question information and answer information obtained from the main control circuit part 20A, the supervisory control circuit part 30A generates the second reset pulse RST2 for initializing and restarting the main control circuit part 20A in cases where the answer information is an incorrect answer.

On the other hand, based on the calculated result of the error correction coefficient Kn with respect to the signal cycle T2 of the medium speed clock signal CLK2 or reverse supervisory information (read-out stored value N1A) received from the supervisory control circuit part 30A, the main control circuit part 20A determines whether the value of the error correction coefficient Kn is out of the predetermined range of allowable upper and lower limit values (abnormal), and generates the first reset pulse RST1 for initializing and restarting the supervisory control circuit part 30A when the result of this determination is out of the range.

In addition, the main control circuit part 20A supervises the receiving interval of question information in the upstream traffic information UPD, and the receiving interval of the reverse supervisory information (read-out stored value N1A) which is the calculated result of the error correction coefficient Kn, or the measurement result with respect to a clock signal cycle required to calculate the error correction coefficient Kn, and generates the first reset pulse RST1 for initializing and restarting the supervisory control circuit part 30A when the result of the measurement of this receiving interval exceeds a predetermined allowable upper limit value.

Alternatively, in cases where the supervisory control circuit part 30A generates a second watchdog signal WD2 (to be described later along with FIG. 9), the main control circuit part 20A supervises the receiving interval of the second watchdog signal WD2, and generates the first reset pulse RST1 for initializing and restarting the supervisory control circuit part 30A when the result of the measurement of this receiving interval exceeds the predetermined allowable upper limit value.

In cases where an abnormal operation which becomes a cause of generation for the second reset pulse RST2 or the first reset pulse RST1 with respect to the main control circuit part 20A or the supervisory control circuit part 30A is due to a temporary noise malfunction, it is possible to restore the main control circuit part 20A or the supervisory control circuit part 30A to its normal state by initializing and restarting it.

However, in cases where such a noise malfunction occurs at random and infrequent intervals, the frequency of generation of a reset pulse is calculated by means of a counter (not shown) for counting the number of times of initialization, whereas when the frequency of occurrence of abnormalities is high, at least a notification of abnormality is carried out and, if the electronic control apparatus is, for example, an engine control system mounted on a vehicle, the vehicle is shifted to a safety driving state in which the driving of electric loads in connection with the safety of the vehicle is stopped. Here, note that the current count value of the counter for counting the number of times of initialization is reset at the time when electric power is turned on.

On the other hand, in cases where the cause for an abnormal operation which has caused the generation of the second reset pulse RST2 or the first reset pulse RST1 is due to the abnormality of hardware, even if the main control circuit part 20A or the supervisory control circuit part 30A is initialized and restarted, the second reset pulse RST2 or the first reset pulse RST1 is generated again, so that the non-driven states of all the electric loads are maintained except for the alarm indication equipment for alarming a malfunction or abnormality in the second group of electric loads 12b.

This is because immediately after initialization and restarting, an abnormality or malfunction check is carried out again before the generation of a load driving output, so that if the abnormality states thereof continue, resetting is again made before the driving of the loads.

Next, reference will be made to a communication operation according to the first embodiment of the present invention shown in FIG. 1 through FIG. 4, while referring to flow charts of FIG. 5 through FIG. 8.

First of all, specific reference will be made to an operation of transmitting information to the supervisory control circuit part 30A by means of the microprocessor 20a in the main control circuit part 20A, while referring to FIG. 5.

Figure 5:
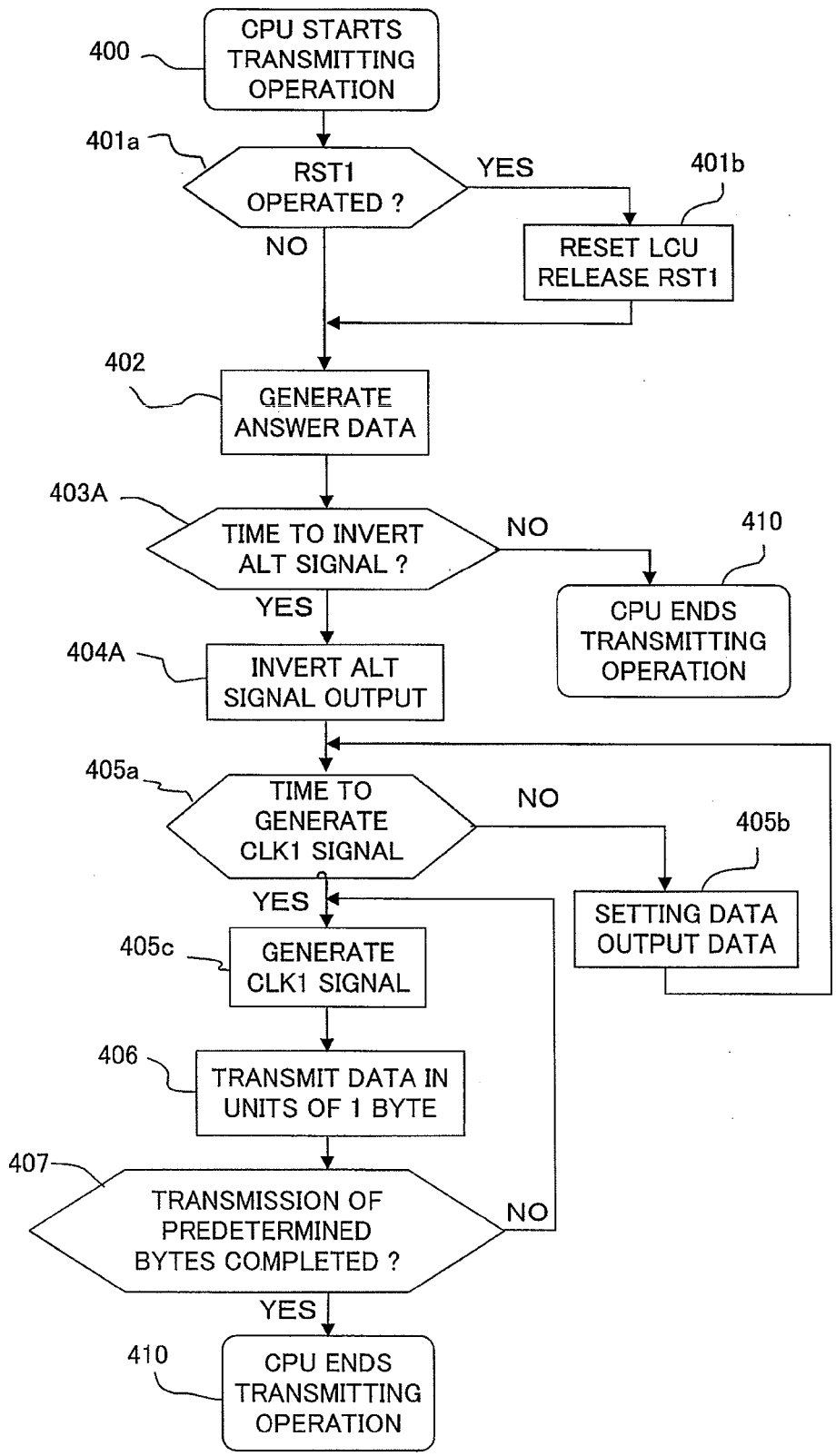
FIG. 5 is a flow chart showing a transmitting operation of a main control circuit part in FIG. 1.

In FIG. 5, when starting an operation of transmitting information to the supervisory control circuit part 30A (step 400), the microprocessor 20a first determines whether the first reset pulse RST1 (reset command output) has been generated (step 401a).

In step 401a, when it is determined that the first reset pulse RST1 has not been generated (that is, NO), answer information corresponding to the question information obtained by an upstream communication preceding a predetermined number of times from the last is generated (step 402).

On the other hand, when it is determined in step 401a that the first reset pulse RST1 has been generated (that is, YES), the communication control circuit part 30a of the supervisory control circuit part 30A is initialized and restarted, and at the same time, the first reset pulse RST1 is canceled (step 401b), after which the control flow shifts to answer information generation processing (step 402).

Here, note that the first reset pulse RST1 is generated in reverse supervision abnormality totaling processing (step 710) in FIG. 8 which will be described later, and it is inputted to the supervisory control circuit part 30A by being canceled in step 401b in FIG. 5.

Following the step 402, the microprocessor 20a makes a determination as to whether it is the time to perform logical inversion of the communication permission signal (alternating signal) ALT (step 403A), and when it is determined to be the time to perform the logical inversion (that is, YES), the logic level of the communication permission signal ALT is inverted (step 404A).

On the other hand, in step 403A, when it is determined to be not the time for logical inversion (that is, NO), a transmission routine of FIG. 5 is ended (step 410).

Following the step 404A, the microprocessor 20a makes a determination as to whether it is the time to generate the communication synchronization signal CLK1, according to whether the predetermined standby time τ (see FIG. 2) has elapsed (step 405a).

In step 405a, when it is determined that it is not the time to generate (the standby time τ has not elapsed) (that is, NO), setting data and output signal data to be transmitted to the supervisory control circuit part 30A are edited, and then a return is made to step 405a within the standby time τ (step 405b).

On the other hand, in step 405a, when it is determined to be the time for generation (the standby time τ has elapsed) (that is, YES), the generation of the communication synchronization signal CLK1 is started (step 405c).

The steps 405a, 405b together constitute a standby step, and until the predetermined standby time τ elapses, the control flow shifts to step 405b at the time of a NO determination in step 405a, and shifts to step 405c at the time of a YES determination in step 405a after the lapse of the standby time τ.

Following the step 405c, the microprocessor 20a cooperates with the DMA 27b to transmit the transmission data of the downstream traffic information DND, for example in units of 8 bits, from the RAM memory 24 to the serial parallel converter 27a in a sequential manner (step 406).

Subsequently, the microprocessor 20a counts the frequency of generation of the communication synchronization signal CLK1 by the use of a clock counter (not shown), and determines whether the transmission of the predetermined number of bytes has been completed (step 407). When it is determined that the transmission has been completed (that is, YES), the transmission routine of FIG. 5 is ended (step 410).

On the other hand, in step 407, when it is determined that the transmission has not been completed (that is, NO), a return is performed to step 405c, and the processing of steps 405c through 407 is carried out in a repeated manner.

Here, note that in step 406, with respect to all the transmitted data, code checking information for detecting whether mixing of bit information (an accidental change of the logic level from a logic "0" to a logic "1") or missing of bit information (an accidental change of the logic level from a logic "1" to a logic "0") at a receiving side has occurred is added as the final information by the use of a code checking system such as represented by a CRC check or a sum check.

In addition, in the operation end processing (step 410), after executing other control operations such as an input/output control operation, a receiving operation (FIG. 8) to be described later, etc., the control flow is again returned (circularly shifted) to the operation start processing (step 400) within a predetermined period of time.

Next, specific reference will be made to an operation of receiving information from the main control circuit part 20A by means of the communication control circuit part (logical circuit LCU) 30a in the supervisory control circuit part 30A, while referring to FIG. 6.

Figure 6:
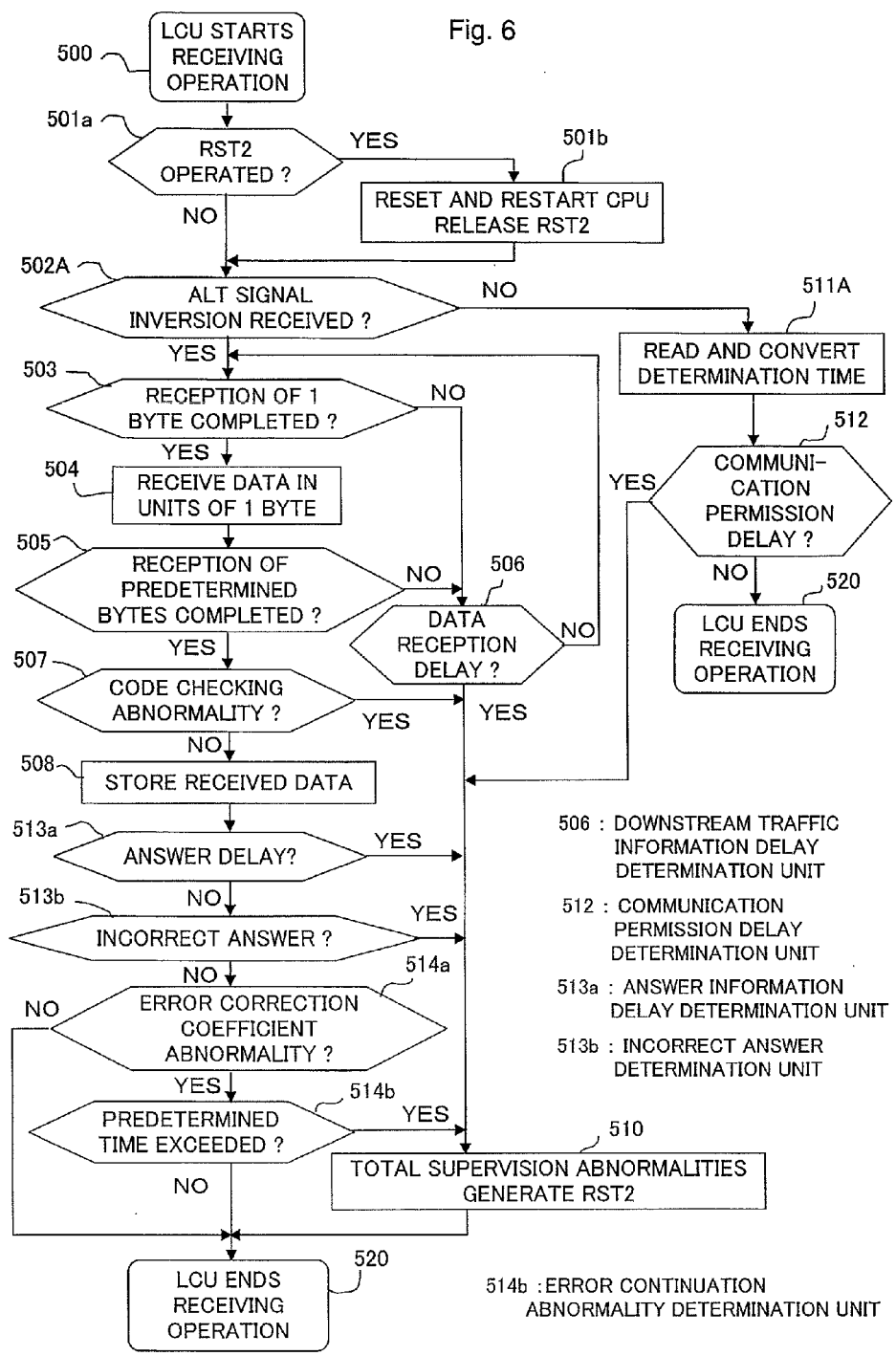
FIG. 6 is a flow chart showing a receiving operation of a supervisory control circuit part in FIG. 1.

In FIG. 6, a receiving logical operation is expressed by an equivalent flow chart.

In FIG. 6, upon starting an operation of receiving information from the main control circuit part 20A (step 500), the communication control circuit part 30a determines whether the second reset pulse RST2 (reset command output) has been generated in step 510 to be described later (step 501a).

In step 501a, when it is determined that the second reset pulse RST2 has not been generated (that is, NO), a determination is subsequently made as to whether it is immediately after the communication permission signal (alternating signal) ALT transmitted from the main control circuit part 20A has carried out logical inversion (step 502A).

In addition, when it is determined that the second reset pulse RST2 has been generated in step 501a (that is, YES), the microprocessor 20a is initialized and restarted, and at the same time, the second reset pulse RST2 is canceled (step 501b), after which the control flow shifts to logical inversion determination processing (step 502A).

In step 502A, when it is determined that it is not immediately after the communication permission signal ALT has been logically inverted (that is, NO), the normal range of the count value of a delay determination counter (not shown), which is provided for timeout check in the later-mentioned processing (steps 506, 512, 513a and 514b), is corrected through conversion based on the above-mentioned equation (2) (step 511A).

Subsequently, the communication control circuit part 30a determines whether the current communication permission has been delayed, depending upon whether the time elapsed from the last communication permission to the current communication permission has exceeded a predetermined value (step 512). When it is determined that the communication permission has been delayed (the elapsed time has exceeded the predetermined value) (that is, YES), the control flow shifts to step 510 to be described later, whereas in step 512, when the communication permission has not been delayed (that is, NO), a transmission routine of FIG. 6 is ended (step 520).

On the other hand, in step 502A, when it is determined that the communication permission signal ALT has been logically inverted (that is, YES), it is subsequently supervised whether the serial parallel converter 37a has generated a reception completion signal of one byte, and it is determined whether the reception of one byte has been completed (step 503). When it is determined that the reception of one byte has not been completed (that is, NO), the control flow shifts to determination processing (step 506) which will be described later.

In addition, in step 503, when it is determined that the reception of one byte has been completed (that is, YES), the received data of the downstream traffic information DND is transmitted, for example in units of 8 bits, from the serial parallel converter 37a to the RAM memory 34 in a sequential manner, and is temporarily stored therein (step 504).

Subsequently, the communication control circuit part 30a counts the frequency of generation of the communication synchronization signal CLK1 by the use of a clock counter (not shown), and makes a determination as to whether the reception of a predetermined number of bytes has been completed (step 505), and when it is determined that the reception of the predetermined number of bytes has not been completed (that is, NO), the control flow shifts to the determination processing (step 506) in which it is determined whether the data reception has been delayed.

In step 506, the communication control circuit part 30a determines whether the time elapsed after the YES determination has been made in step 502A has exceeded a predetermined allowable time, and when it is determined that the elapsed time is within the allowable time and there is no delay (normal) (that is, NO), a return to step 503 is carried out.

On the other hand, in step 506, when it is determined that the allowable time has been exceeded and a delay has occurred (abnormal) (that is, YES), the control flow shifts to step 510 to be described later.

Here, note that the time which has been corrected through conversion in the above-mentioned step 511A is applied as the allowable time for delay determination in step 506.

On the other hand, in step 505, when it is determined that the reception of the predetermined number of bytes has been completed (that is, YES), the control flow subsequently shifts to abnormality determination processing (step 507) which becomes a digital error detection system.

In step 507, the communication control circuit part 30a checks, by the use of the code checking information added in step 406 in FIG. 5, whether mixing or missing abnormality of bit information has occurred in the received downstream traffic information DND, by means of a sum check or CRC check.

In step 507, when it is determined that a code checking abnormality has occurred (that is, YES), the control flow shifts to step 510 to be described later.

On the other hand, in step 507, when it is determined that no code checking abnormality has occurred (that is, NO), the received data which has been temporarily stored in step 504 is stored as valid data, and is transmitted as setting information and output signal information (step 508).

Subsequently, the communication control circuit part 30a determines whether an answer delay has occurred, depending upon whether answer information corresponding to the question information transmitted in the past has been replied in the predetermined allowable time (step 513a), and when an answer delay is determined to have occurred (that is, YES), the control flow shifts to step 510 to be described later.

On the other hand, in step 513b, when it is determined that no code checking abnormality has occurred (that is, NO), it is subsequently determined whether the answer information is an incorrect answer, depending upon whether correct answer information corresponding to the past question information transmitted in step 606 (see FIG. 7) to be described later and the current answer information stored in step 508 match with each other (step 513b).

Here, note that past question information, correct answer information corresponding to this, and answer information received at this time are associated with one another by means of the same tag number.

In step 513b, when it is determined that answer information is an incorrect answer (that is, YES), the control flow shifts to step 510 to be described later.

On the other hand, in step 513b, when it is determined that the answer information is a correct answer (that is, NO), it is subsequently determined whether the error correction coefficient Kn is abnormal, depending upon whether the value of the error correction coefficient Kn calculated by the error correction coefficient calculating circuit 317 in FIG. 4 becomes out of the predetermined range (step 514a), and when it is determined that the error correction coefficient Kn is normal (that is, NO), the processing routine of FIG. 6 is ended (step 520).

In addition, in step 514a, when it is determined that the error correction coefficient Kn is an abnormal value exceeding the predetermined range (allowable fluctuation range) (that is, YES), it is subsequently determined whether the abnormality determination processing (step 514a) has continued for a predetermined time or more (step 514b), and when it is determined that the abnormality determination processing has continued to exceed the predetermined time (that is, YES), the control flow shifts to step 510 to be described later.

On the other hand, in step 514b, when it is determined that the abnormality determination processing (step 514a) has not continued to exceed the predetermined time (that is, NO), the processing routine of FIG. 6 is ended (step 520).

Here, note that the same abnormality determination processing of the error correction coefficient Kn as that of the step 514a is executed at the side of the main control circuit part 20A (microprocessor 20a), such as step 709b (see FIG. 8) to be described later, and when the error correction coefficient Kn is abnormal, the supervisory control circuit part 30A is initialized and restarted. However, in cases where the above-mentioned abnormality processing is not executed due to communication abnormality, etc., the step 510 is executed according to a YES determination in step 514b.

In step 510, the communication control circuit part 30a generates the second reset pulse RST2 (reset command output) while performing supervision abnormality totaling processing, after which the control flow shifts to operation end processing (step 520).

The step 510 is constituted by a second reversible error counter (not shown), and each time an abnormality determination is made in either of the respective determination processes (steps 506, 507, 512, 513a, 513b and 514b) (that is, YES), the current count value of the second reversible error counter is incremented by "5 counts", for example, whereas each time a normality determination is made (that is, NO), the current count value of the second reversible error counter is decremented by "1 count", for example. In addition, subtraction restriction is provided so as to prevent the current count value of the second reversible error counter from becoming equal to or less than "0".

In step 510, the communication control circuit part 30a generates the second reset pulse RST2 (reset command output) at the time when the current count value of the second reversible error counter (supervision totaled result) exceeds a predetermined value (e.g., "11").

Here, note that the supervision totaled value in step 510 is initialized at the time when the microprocessor 20a is initialized and restarted in step 501b.

In the operation end processing (step 520) following the step 510, a return is made to the operation start step 500 after other control including a transmission control operation (FIG. 7) has been carried out.

Here, note that in each determination processing in FIG. 6, the step 506 constitutes a delay abnormality determination unit for downstream traffic information; the step 512 constitutes a delay determination unit for the alternating operation of the communication permission signal ALT; the step 513a constitutes a delay abnormality determination unit for answer information; and the step 514b constitutes a determination unit for error continuation abnormality.

Each of the abnormality determination units, which are constituted by steps 506, 512, 513a and 514b, determines the presence or absence of abnormality by counting the frequency of generation of the medium speed clock signal CLK2, and comparing it with a determination threshold which has been converted and read out in step 511A, as stated above.

In contrast to this, the step 513b constitutes an incorrect answer determination unit that makes an incorrect answer determination by comparing answer information with correct answer information, and the step 507 constitutes a determination unit for code checking abnormality with respect to the received data.

Next, specific reference will be made to an information transmitting operation by the communication control circuit part (logical circuit LCU) 30a in the supervisory control circuit part 30A, while referring to FIG. 7.

Figure 7:
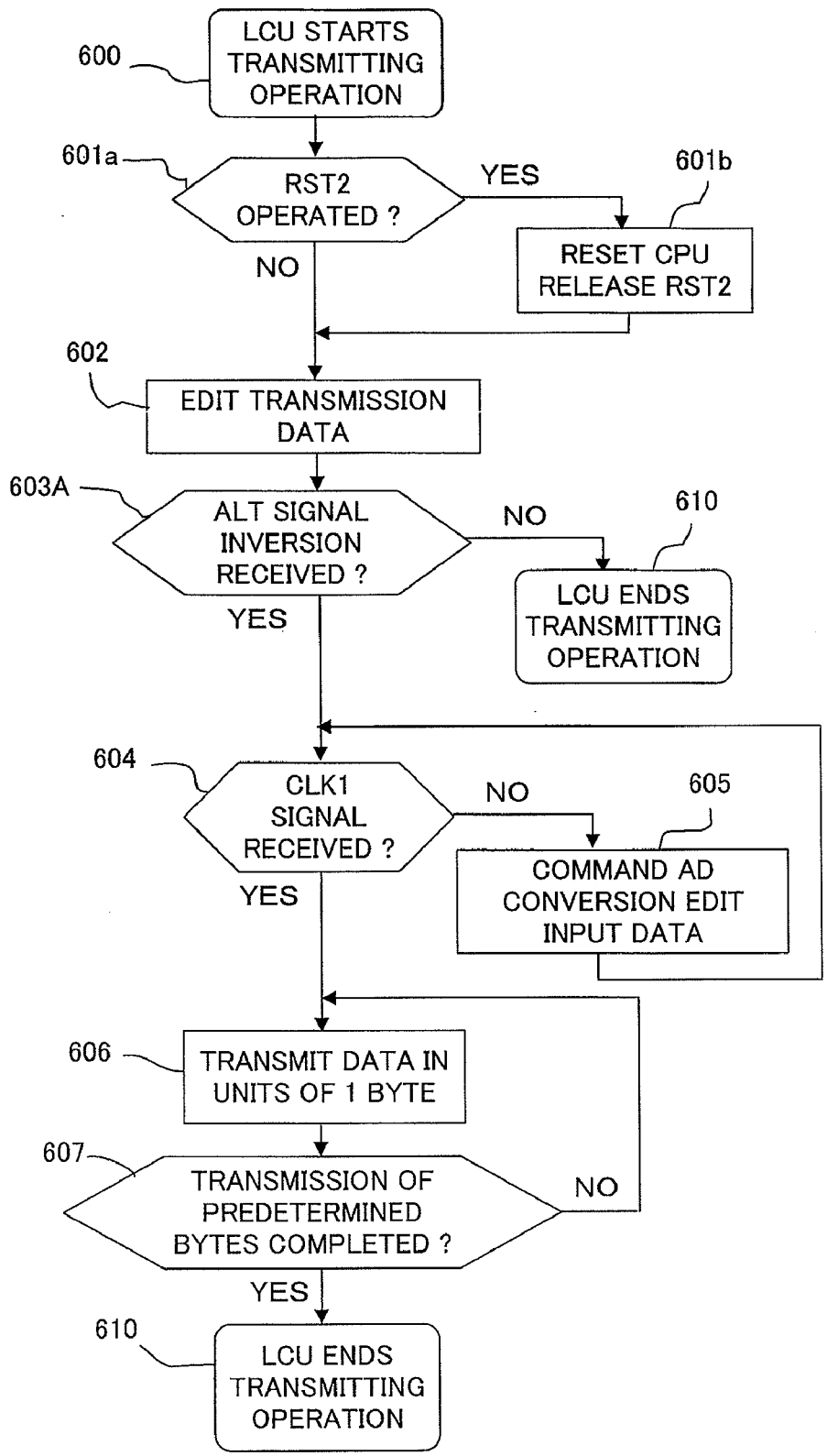
FIG. 7 is a flow chart showing a transmitting operation of the supervisory control circuit part in FIG. 1.

In FIG. 7, a transmitting logical operation is expressed by an equivalent flow chart.

In FIG. 7, upon starting an operation of transmitting information to the main control circuit part 20A (step 600), the communication control circuit part 30a determines whether the second reset pulse RST2 (reset command output) has been generated in step 510 in FIG. 6 (step 601a).

In step 601a, when it is determined that no second reset pulse RST2 has been generated (that is, NO), the stored information, such as setting information, output signal information, and the like, which has been determined and stored in step 508 in FIG. 6, currently updated question information, reverse supervisory information which is the value of the error correction coefficient Kn (or the value of the read-out and stored value N1A in FIG. 4), and transmission information, such as a supervision abnormality total value totaled in step 510 in FIG. 6, are edited, as the current transmission information, according to the transmission sequence (step 602).

In addition, in step 601a, when it is determined that the second reset pulse RST2 has been generated (that is, YES), the microprocessor 20a is initialized and restarted, and at the same time, the second reset pulse RST2 is canceled (step 601b), after which the control flow shifts to information editing processing (step 602).

Following the step 602, the communication control circuit part 30a supervises the communication permission signal ALT, and determines whether it is immediately after the communication permission signal ALT has been logically inverted (step 603A). When it is determined that it is not immediately after the communication permission signal ALT has been logically inverted (that is, NO), the processing routine of FIG. 7 is ended (step 610).

On the other hand, in step 603A, when it is determined that it is immediately after the communication permission signal ALT has been logically inverted (that is, YES), it is subsequently determined whether the communication synchronization signal CLK1 has been received (step 604).

Figure 2:
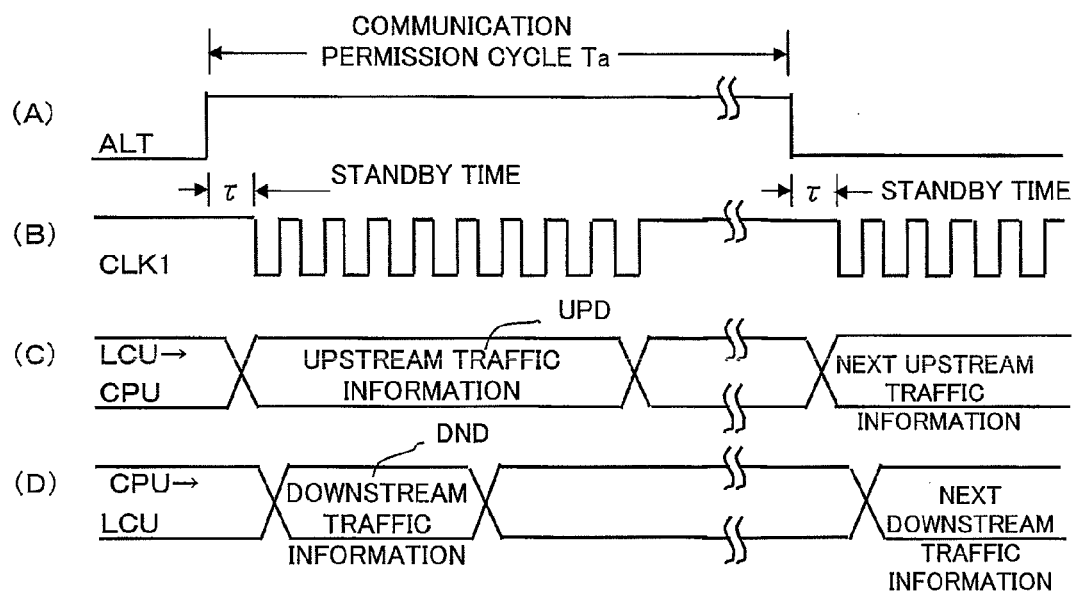
FIG. 2 is a timing chart showing a serial communication operation according to the first embodiment of the present invention.

In step 604, when it is determined that the communication synchronization signal CLK1 has not been received (that is, NO), an AD conversion command is generated to the multichannel AD converter 36, and the newest AD conversion information obtained is started to be edited as input data to be transmitted to the main control circuit part 20A (step 605), after which a return is made to step 604 within the standby time τ (see FIG. 2).

Here, note that after the standby time τ has completed with the lapse of a delay time at which an AD conversion completion signal is received from the multi-channel AD converter 36, the control flow shifts to step 604, where the main control circuit part 20A starts the generation of the communication synchronization signal CLK1.

On the other hand, in step 604, when it is determined that the communication synchronization signal CLK1 has been received (that is, YES), the transmission data of the upstream traffic information UPD is sequentially transmitted in units of 1 byte from the RAM memory 34 to the serial parallel converter 37a which constitutes a serial communication circuit (serial interface device) (step 606).

The data transmitted in step 606 includes the transmission data edited in step 602 and the latest input data edited in step 605.

Subsequently, the communication control circuit part 30a counts the frequency of generation of the communication synchronization signal CLK1 by the use of the clock counter (not shown), and determines whether the transmission of the predetermined number of bytes has been completed (step 607). When it is determined that the transmission has been completed (that is, YES), the transmission routine of FIG. 5 is ended (step 410), whereas when it is determined that the transmission has been completed (that is, YES), the control flow shifts to operation end processing (step 610).

Here, note that in step 606, with respect to all the transmitted data, by the use of a code check system such as represented by a CRC check or a sum check, code checking information for detecting whether mixing of bit information (an accidental change of the logic level from a logic "0" to a logic "1") or missing of bit information (an accidental change of the logic level from a logic "1" to a logic "0") has occurred at a receiving side is added as the final information.

In addition, in the operation end processing (step 610), after executing other control operations including a receiving control operation (FIG. 6), and the control flow is again returned (circularly shifted) to the operation start processing (step 600) within a predetermined period of time.

Next, specific reference will be made to an information receiving operation of the microprocessor 20a in the main control circuit part 20A, while referring to FIG. 8.

Figure 8:
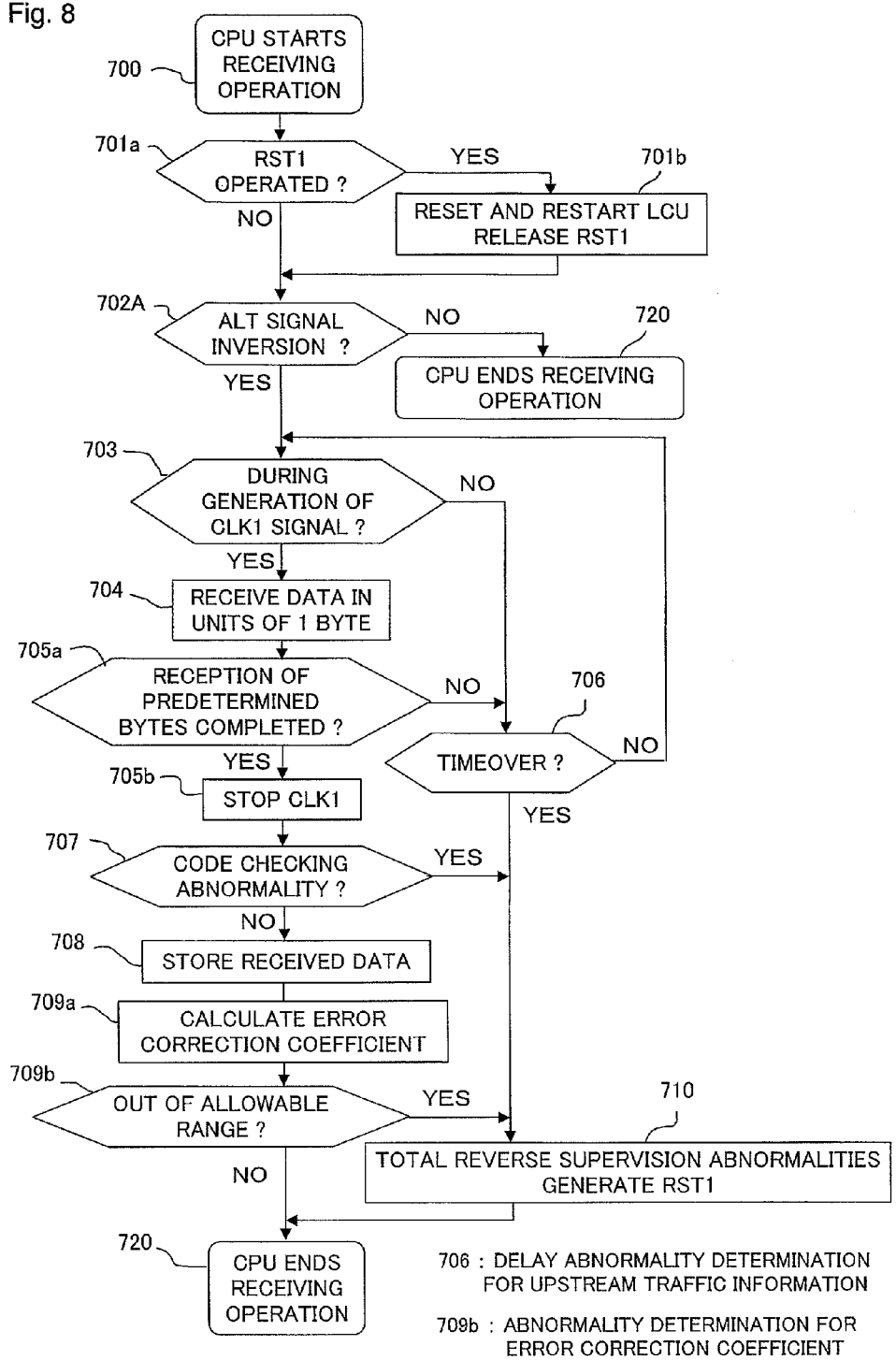
FIG. 8 is a flow chart showing a receiving operation of the main control circuit part in FIG. 1.

In FIG. 8, when starting an operation of receiving information from the supervisory control circuit part 30A (step 700), the microprocessor 20a first determines whether the first reset pulse RST1 (reset command output) has been generated by reverse supervision abnormality totaling processing (step 710) to be described later (step 701a).

In step 701a, when it is determined that the first reset pulse RST1 has not been generated (that is, NO), a determination is subsequently made according to step 404A in FIG. 5 as to whether it is immediately after the communication permission signal (alternating signal) ALT has been logically inverted (step 702A).

On the other hand, when it is determined in step 701a that the first reset pulse RST1 has been generated (that is, YES), the supervisory control circuit part 30A is initialized and restarted, and at the same time, the first reset pulse RST1 is canceled (step 701b), after which the control flow shifts to step 702A for information editing processing.

In step 702A, when it is not immediately after the communication permission signal ALT has not been logically inverted (that is, NO), a processing routine of FIG. 8 is ended (step 720).

On the other hand, when it is determined that the communication permission signal ALT has been logically inverted (that is, YES), it is subsequently determined according to the step 405c in FIG. 5 whether the communication synchronization signal CLK1 has started to be generated (step 703).

In step 703, when it is determined that the communication synchronization signal CLK1 has not started to be generated (that is, NO), the control flow shifts to determination processing (step 706) to be described later.

On the other hand, in step 703, when it is determined that the communication synchronization signal CLK1 has started to be generated (that is, YES), the microprocessor 20a cooperates with DMA 27b to transmit the received data of the upstream traffic information UPD, for example in units of 8 bits, from the serial parallel converter 27a to the RAM memory 24 in a sequential manner, and to temporarily store it therein (step 704).

Subsequently, the microprocessor 20a counts the frequency of generation of the communication synchronization signal CLK1 by the use of a clock counter (not shown), and makes a determination as to whether the reception of a predetermined number of bytes has been completed (step 705a), and when it is determined that the reception of the predetermined number of bytes has not been completed (that is, NO), the microprocessor 20a determines whether the time elapsed after a logical inversion of the communication permission signal ALT has passed over (step 706).

In step 706, the microprocessor 20a measure, by means of a time counter (not shown), the time elapsed after the logical inversion of the communication permission signal ALT is detected in step 702A, and determines whether this elapsed time has exceeded a predetermined allowable time.

In step 706, when it is determined that the time elapsed after the logical inversion is within the predetermined time (that is, NO), the control flow returns to step 703.

On the other hand, in step 706, when it is determined that the time elapsed after the logical inversion has exceeded the predetermined time (that is, YES), the control flow shifts to reverse supervision abnormality totaling processing (step 710) to be described later.

In addition, in step 705a, when it is determined that the reception of the predetermined number of bytes has been completed (that is, YES), the generation of the communication synchronization signal CLK1 is stopped (step 705b), and the control flow subsequently shifts to abnormality determination processing (step 707) which becomes a digital error detection system.

In step 707, the microprocessor 20a checks, by the use of the code checking information added in step 606 in FIG. 7, whether mixing or missing abnormality of bit information has occurred in the received upstream traffic information UPD, by means of a sum check or CRC check.

In step 707, when it is determined that a code checking abnormality has occurred (that is, YES), the control flow shifts to reverse supervision abnormality totaling processing (step 710).

On the other hand, in step 707, when it is determined that no code checking abnormality has occurred (that is, NO), the received data which has been temporarily stored in step 704 is stored as valid data, and is used as new input signal information (step 708).

Subsequently, the microprocessor 20a reads out the error correction coefficient Kn (or reverse supervisory information therein in cases where the reverse supervisory information for calculating the error correction coefficient Kn is stored) in the upstream traffic information UPD which has been received and stored in step 708, and calculates the error correction coefficient Kn (step 709a).

Moreover, the microprocessor 20a determines whether the value of the error correction coefficient Kn read out or calculated in step 709a is out of the predetermined range of allowable upper and lower limit values (abnormal) (step 709b), and when it is determined that the error correction coefficient Kn is within the predetermined range (normal) (that is, NO), the control flow shifts to operation end processing (step 720).

On the other hand, in step 709b, when it is determined that the error correction coefficient Kn is out of the predetermined range (abnormal) (that is, YES), the control flow shifts to reverse supervision abnormality totaling processing (step 710).

The step 710 is constituted by a first reversible error counter (not shown), and each time an abnormality determination is made in either of the respective determination processes (steps 706, 707 and 709b) (that is, YES), the current count value of the first reversible error counter is incremented by "5 counts", for example, whereas each time a normality determination is made (that is, NO), the current count value of the first reversible error counter is decremented by "1 count", for example. In addition, subtraction restriction is provided so as to prevent the current count value of the first reversible error counter from becoming equal to or less than "0".

In step 710, at the time when the current count value of the first reversible error counter (supervision totaled result) exceeds a predetermined value (e.g., "11"), the microprocessor 20a generates the first reset pulse RST1 (reset command output), and shifts to operation end processing (step 520).

Here, note that the supervision totaled value in step 710 is initialized to the current count value "0" at the time when the supervisory control circuit part 30A is initialized and restarted in step 701b.

In addition, in the operation end processing (step 720), a return is made to the operation start step 700 after other control operations including a transmission control operation (FIG. 5) and input and output control operations (FIG. 6 and FIG. 7) have been carried out.

Here, note that in each determination processing in FIG. 8, the step 706 constitutes a delay abnormality determination unit for upstream traffic information, and determines a timeover (abnormal) state if question information is not periodically transmitted from the supervisory control circuit part 30A.

In addition, the step 709b constitutes an abnormality determination unit for the error correction coefficient Kn, and the step 707 constitutes a determination unit for code checking abnormality with respect to the received data from the supervisory control circuit part 30A.

Here, note that when the supervisory control circuit part 30A is initialized and restarted by the first reset pulse RST1 or the reset pulse RST, or when the main control circuit part 20A is initialized and restarted by the second reset pulse RST2 or the reset pulse RST, the number or frequency of initialization and start is temporarily stored as one of pieces of abnormality occurrence history information in the RAM memory 24 or the RAM memory 34, and this abnormality occurrence history information is transferred to and stored in a nonvolatile data memory (not shown) or in a partial region of the program memory 25A in a delay interruption period immediately after a power supply switch (not shown) is interrupted.

In addition, when the frequency of initialization and restart of the supervisory control circuit part 30A or the main control circuit part 20A becomes equal to or more than a prescribed frequency from the time when the power supply switch (not shown) is closed, a notification of abnormality is made by an abnormality alarming device that is included by at least either one of the first and second electric loads 12a, 12b. Moreover, in the above-mentioned explanation, the logical circuit LCU is used as the communication control circuit part 30a in the supervisory control circuit part 30A, but in place of this, an auxiliary microprocessor SCPU may be used which is operated by means of an auxiliary program memory.

According to this, a watchdog signal generated by the auxiliary microprocessor SCPU can also be constructed in such a manner that it is supervised by the microprocessor 20a in the main control circuit part 20A.

As described above, the electronic control apparatus 10A according to the first embodiment (FIG. 1 through FIG. 8) of the present invention is provided with the main control circuit part 20A and the supervisory control circuit part 30A, both of which are mutually connected in series with each other by means of the serial parallel converters 27a, 37a, wherein the first and second group of electric loads 12a, 12b are driven and controlled in response to the operating states of the first and second group of input sensors 11a, 11b and in response to the input and output control program stored in the program memory 25A.

The main control circuit part 20A is provided with the microprocessor 20a that is operated by means of the high speed clock signal CLKO, and the program memory 25A that cooperates with the microprocessor 20a, wherein the downstream traffic information DND, which includes the driving control signal for the second group of electric loads 12b, the communication synchronization signal CLK1 which is obtained by frequency dividing the high speed clock signal CLK0, and the communication permission signal ALT, are periodically transmitted to the supervisory control circuit part 30A.

The supervisory control circuit part 30A is provided with the clock signal source 38 (clock signal generating circuit) that is independent of the high speed clock signal CLK0, and the communication control circuit part 30a that is driven to operate by means of the medium speed clock signal CLK2 generated from the clock signal source 38, wherein the upstream traffic information UPD including an input supervisory signal which responds to the operating state of the second group of input sensors 11b is periodically transmitted to the main control circuit part 20A from a time point of reception of the communication permission signal ALT.

In addition, the supervisory control circuit part 30A is provided with the error measuring circuit 300A for calculating the error correction coefficient Kn corresponding to the individual variation and the variation over time of the medium speed clock signal CLK2 by making a relative comparison between the signal cycle T1 of the communication synchronization signal CLK1 and the signal cycle T2 of the medium speed clock signal CLK2 in a periodic manner, and supervises and measures the receiving interval of the specific supervisory signal based on the medium speed clock signal CLK2 and the error correction coefficient Kn in a periodic manner.

The receiving interval of the specific supervisory signal is the receiving interval of the communication permission signal ALT, or the receiving interval of the downstream traffic information DND, or the receiving interval of the answer information periodically transmitted by means of the downstream traffic information DND in response to the question information periodically transmitted by means of the upstream traffic information UPD.

The supervisory control circuit part 30A transmits the reverse supervisory information N1A, which is the calculated result of the error correction coefficient Kn or the measurement result with respect to the clock signal cycle required in order to calculate the error correction coefficient Kn, to the main control circuit part 20A as a part of the upstream traffic information UPD, and at the same time, generates the second reset pulse RST2 (second reset pulse) for initializing and restarting the main control circuit part 20A at the time when the result of the supervision and measurement of the receiving interval of the specific supervisory signal exceeds a predetermined allowable upper limit value.

In this manner, the main control circuit part 20A, which serves to intermittently transmit the communication synchronization signal CLK1 for serial communications, and the supervisory control circuit part 30A, which is driven to operate by means of the medium speed clock signal CLK2, are mutually connected with each other, and the supervisory control circuit part 30A calculates the error correction coefficient Kn for correcting a variation error of the signal cycle T2 of the medium speed clock signal CLK2, based on the communication synchronization signal CLK1 in a periodic manner, and at the same time, supervises and measures the receiving interval of the specific supervisory signal periodically generated by the main control circuit part 20A, based on the medium speed clock signal CLK2 and the error correction coefficient Kn in a periodic manner.

As a result of this, the main control circuit part 20A and the supervisory control circuit part 30A are driven to operate by means of the mutually independent clock signals (CLK0, CLK2), so that the operating states of the main control circuit part 20A and the supervisory control circuit part 30A can be supervised or reverse supervised in a mutual manner, thereby making it possible to improve safety in operation of the electronic control apparatus as a whole.

Also, it is not necessary to transmit the high speed clock signal CLK0, which becomes a cause of noise generation, to the supervisory control circuit part in a continuous manner, as a result of which even if the medium speed clock signal being added is inexpensive and low in precision, it is possible to perform a delay determination of the specific supervisory signal in a precise manner by the use of the error correction coefficient, thereby making it possible to achieve highly precise supervisory control with inexpensive construction.

In addition, in the electronic control apparatus 10A according to the first embodiment (FIG. 1 through FIG. 8) of the present invention, the main control circuit part 20A is provided with a reverse supervision abnormality totaling unit (step 710) that serves to determine whether an abnormal state of reverse supervisory information continues, and at the same time, the supervisory control circuit part 30A is provided with a supervision abnormality totaling unit (step 510) that serves to determine whether an abnormal state of supervisory information continues.

The main control circuit part 20A determines whether the value of the error correction coefficient Kn is out of the predetermined range of allowable upper and lower limit values, based on the calculated result of the error correction coefficient Kn or reverse supervisory information (read-out stored value N1A) received from the supervisory control circuit part 30A, and generates the first reset pulse for initializing and restarting the supervisory control circuit part 30A when it is determined that an abnormal state in which the value of the error correction coefficient Kn is out of the predetermined range continues.

Further, the supervisory control circuit part 30A generates the second reset pulse for initializing and restarting the main control circuit part 20A when it is determined that an abnormal state in which the calculated result of the error correction coefficient Kn is out of the predetermined range continues.

When the initialization and restart of the main control circuit part 20A and the supervisory control circuit part 30A are performed, abnormality occurrence history information is saved, and at the same time, in cases where an abnormal state still continues even if the initialization and restart of the main control circuit part 20A and the supervisory control circuit part 30A are performed, a notification of abnormality is made by the above-mentioned abnormality alarming device included at least in the first or second electric loads 12a or 12b.

In this manner, when the abnormal state of the reverse supervisory information of the error correction coefficient Kn continues, the supervisory control circuit part 30A is initialized and restarted by the main control circuit part 20A, whereas in cases where the abnormal state of the error correction coefficient Kn continues, the main control circuit part 20A is initialized and restarted by the supervisory control circuit part 30A.

As a result of this, in cases where the signal cycle T2 of the medium speed clock signal CLK2 is abnormal, the supervisory control circuit part 30A is initialized and restarted by the main control circuit part 20A, whereas in cases where the high speed clock signal CLK0 or the communication synchronization signal CLK1 becomes abnormal (i.e., the communication line is abnormal), the main control circuit part 20A can be initialized and restarted by the supervisory control circuit part 30A.

In addition, the electronic control apparatus 10A is provided with the watchdog timer 40, and the first watchdog signal WD1 generated by the microprocessor 20a is supervised by the watchdog timer 40.

The watchdog timer 40 generates the reset pulse RST for initializing and restarting the main control circuit part 20A and the supervisory control circuit part 30A when the pulse width of the first watchdog signal WD1 is out of a predetermined range of allowable upper and lower limit values.

The main control circuit part 20A reversely supervises and measures the receiving interval of a specific reverse supervisory signal based on the high speed clock signal CLK0 from the clock signal source 28 in a periodic manner.

The receiving interval of the specific reverse supervisory signal is the receiving interval of question information in the upstream traffic information UPD, or the receiving interval of the reverse supervisory information N1A which is the calculated result of the error correction coefficient Kn or the measurement result with respect to a clock signal cycle required to calculate the error correction coefficient Kn.

Alternatively, in cases where the supervisory control circuit part 30A generates the second watchdog signal WD2, the receiving interval of the specific reverse supervisory signal is the receiving interval of the second watchdog signal WD2.

The main control circuit part 20A generates the first reset pulse RST1 for initializing and restarting the supervisory control circuit part 30A when the result of the measurement of the receiving interval of the specific reverse supervisory signal exceeds the predetermined allowable upper limit value.

In this manner, the microprocessor 20a is supervised by the watchdog timer 40 and the supervisory control circuit part 30A, and the supervisory control circuit part 30A is reversely supervised by the microprocessor 20a.

Accordingly, the main control circuit part 20A can comprehensively determine the presence or absence of an abnormality of the medium speed clock signal CLK2, based on the calculated result of the error correction coefficient Kn and the receiving interval of the upstream traffic information UPD, or based on the calculated result of the error correction coefficient Kn and the determination result of the second watchdog signal WD2.

In addition, the fluctuation region of the signal cycle T2 of the medium speed clock signal CLK2 has its allowable variation fluctuation range restricted to a relation in which the signal cycle T2 of the medium speed clock signal CLK2 is lower in speed and longer in period as compared with the signal cycle T1 of the communication synchronization signal CLK1, and at the same time, is higher in speed and shorter in period than a serial parallel conversion cycle in which the serial parallel converters 27a, 28a perform serial parallel conversion of a plurality of bits of upstream traffic information UPD or downstream traffic information DND based on the communication synchronization signal CLK1 in a sequential manner.

As a result of this, the signal cycle T2 of the medium speed clock signal CLK2 is set to be between the signal cycle T1 of the communication synchronization signal CLK1 and the serial parallel conversion cycle thereof, so it is possible to avoid the signal cycle T1 of the communication synchronization signal CLK1 from becoming between the maximum and the minimum of the signal cycle T2 of the medium speed clock signal CLK2.

Accordingly, the logic processing of the communication control circuit part (LCU) 30a is simplified, and at the same time, it is possible to avoid communication traffic congestion from occurring due to a response delay at the side of the communication control circuit part 30a.

Moreover, the error measuring circuit 300A (FIG. 4) is provided with the second counter 310a that calculates the frequency of generation of the medium speed clock signal CLK2, the first counter 310b that calculates the frequency of generation of the communication synchronization signal CLK1, the coincidence determining circuit 315a that generates the count stop command signal ST at the time when the current count value CNT2 of the second counter 310a reaches the predetermined set threshold N2A, the second gate circuit 311a that is formed in a count input circuit of the second counter 310a, the first gate circuit 311b that is formed in a count input circuit of the first counter 310b, and the measuring and storing circuit 316 that stores the current count value CNT1 of the first counter 310b as the read-out stored value N1A at the time when the count stop command signal ST is generated.

The second gate circuit 311a permits counting of the medium speed clock signal CLK2 by means of the second counter 310a at the time when the communication synchronization signal CLK1 starts to be generated, and prohibits the counting operation of the second counter 310a at the time when the count stop command signal ST is generated.

The first gate circuit 311b permits counting of the communication synchronization signal CLK1 by means of the first counter 310b at the time when the first counting of the second counter 310a is started, and prohibits the counting operation of the first counter 310b at the time when the count stop command signal ST is generated.

The error correction coefficient calculating circuit 317 in the error measuring circuit 300A calculates the error correction coefficient Kn, which is the ratio of the signal cycle T2 of the medium speed clock signal CLK2 to the signal cycle T1 of the communication synchronization signal CLK1, by the use of the read-out stored value N1A (the frequency of the generation of the communication synchronization signal CLK1 at the time when the medium speed clock signal CLK2 has been generated by a frequency or a number of times corresponding to the set threshold N2A) of the measuring and storing circuit 316, according to the following equation (1):
$Kn=T2/T1=N1A/(N2A-1)$.

In this manner, by measuring the signal cycle T2 of the medium speed clock signal CLK2 by counting how many times the communication synchronization signal CLK1 has been generated within a period of time in which the medium speed clock signal CLK2 has been generated a prescribed number of times, the communication synchronization signal CLK1 is counted by means of the first counter 310b from the time immediately after the second counter 310a has counted the first medium speed clock signal CLK2.

Accordingly, the first counter 310b counts the first communication synchronization signal CLK1 without fail by the time the current count value CNT2 of the second counter 310a becomes "2", thus making it possible to prevent the generation of a count error due to a variation in count start timing.

Further, each time the communication permission signal ALT is generated, the current count values CNT1, CNT2 of the first and second counters 310b, 310a are reset, the stored information by the measuring and storing circuit 316 is updated in a sequential manner, and the error correction coefficient calculating circuit 317 newly calculates the error correction coefficient Kn.

In this manner, by calculating the error correction coefficient Kn in a repeated manner, it is possible to update and calculate the exact error correction coefficient Kn corresponding to the variation over time of the signal cycle T2 of the medium speed clock signal CLK2 due to an environmental temperature change.

Furthermore, the supervisory control circuit part 30A is provided with the communication control circuit part 30a and the error measuring circuit 300A (including the error correction coefficient calculating circuit 317), both of which are composed of hard logic circuits, and further with the data memory 35A in which correct answer information corresponding to question information is stored.

The communication control circuit part 30a transmits an input supervisory signal, which responds to the operating state of the second group of input sensors 11b, and question information to the main control circuit part 20A, and at the same time, receives a driving control signal for the second group of electric loads 12b and answer information generated by the main control circuit part 20A, whereby it makes a comparison between the answer information and correct answer information corresponding to the question information, and generates the second reset pulse RST2 for initializing and restarting the main control circuit part 20A in cases where the answer information is an incorrect answer.

In this manner, by constituting the communication control circuit part 30a and the error measuring circuit 300A in the supervisory control circuit part 30A from the hard logic circuits, it is possible to avoid the generation of a response delay and communication traffic congestion even if the signal cycle T2 of the medium speed clock signal CLK2 is lower in speed and longer in period than the signal cycle T1 of the communication synchronization signal CLK1.

In addition, the correct answer information to the question information is beforehand stored in the supervisory control circuit part 30A, so it is possible to determine through comparison the validity of the answer information without carrying out complicated calculation processing.

Second Embodiment

Figure 9:
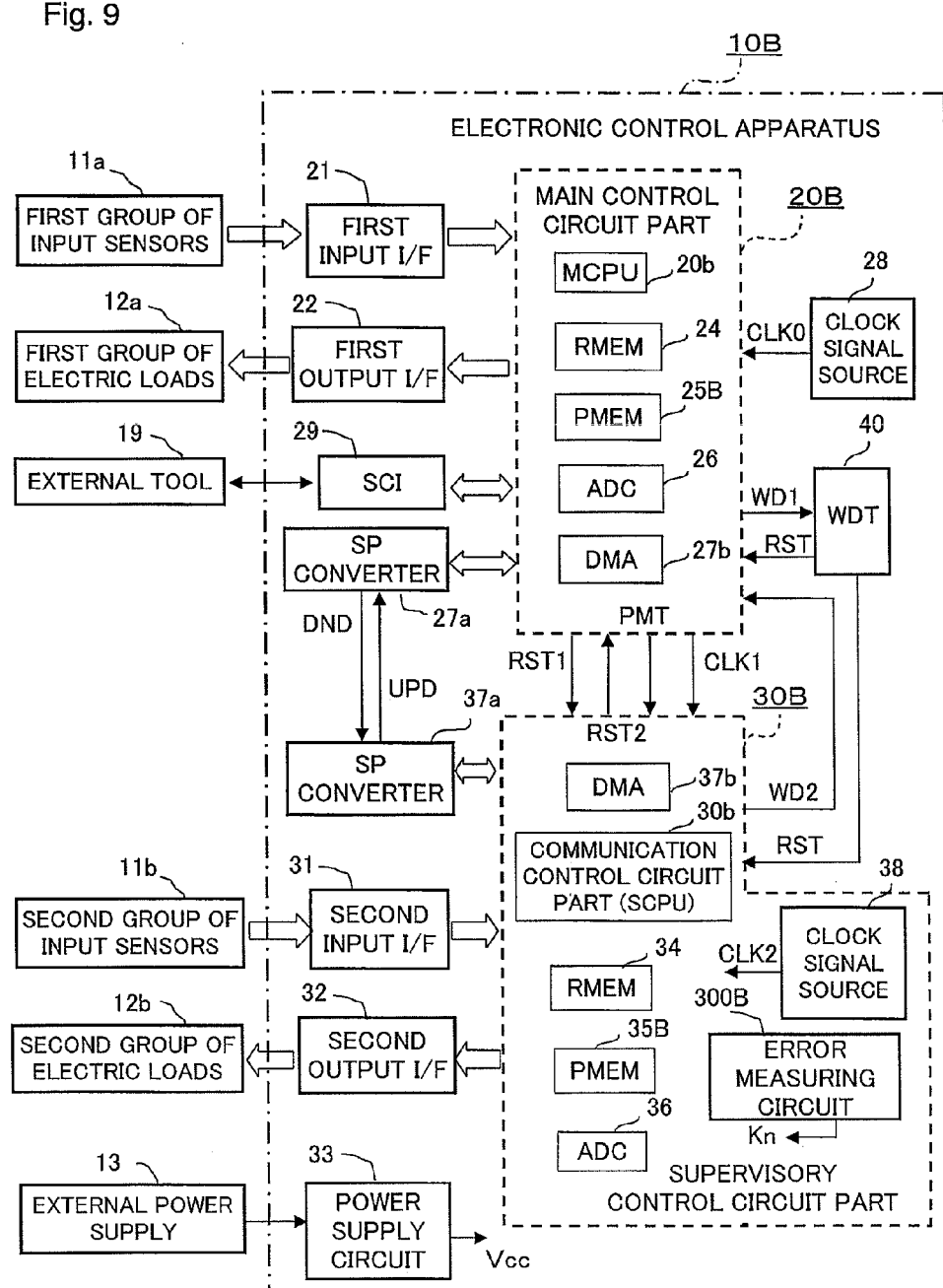
FIG. 9 is a circuit block diagram showing the overall construction of an electronic control apparatus according to a second embodiment of the present invention, together with its related peripheral elements.

Although no specific reference has been made to the above-mentioned first embodiment (FIG. 1 through FIG. 8), in order to simplify control processing, a communication control circuit part 30b in a supervisory control circuit part 30B may be composed of an auxiliary microprocessor (SCPU), and at the same time, an auxiliary program memory (PMEM) 35B may be formed in the supervisory control circuit part 30B, as shown in FIG. 9.

On the contrary, in place of the auxiliary microprocessor (SCPU) in FIG. 9, the supervisory control circuit part can also be composed of a logical circuit which does not have a microprocessor, as shown in FIG. 1.

In the case of the logical circuit without a microprocessor, however, it is necessary to replace control programs to be explained below, such as an error correction coefficient calculation unit, a moving average value calculation unit, and the like, by a correction factor calculation circuit, a moving average value calculation circuit, and the like, which are constituted by logical circuits.

FIG. 9 is a circuit block diagram showing the overall construction of an electronic control apparatus according to a second embodiment of the present invention, together with its related peripheral elements, wherein those components which are similar to the above-mentioned ones (see FIG. 1) are denoted by the same reference numerals and characters as those in the above-mentioned embodiment, or with "B" or "b" being attached to reference numerals, and a detailed description thereof is omitted.

In FIG. 9, a microprocessor 20b in a main control circuit part 20B is denoted as a main microprocessor (MCPU) so as to distinguish it from an auxiliary microprocessor (SCPU) in a supervisory control circuit part 30B.

In FIG. 9, an electronic control apparatus 10B is provided with the main control circuit part 20B that is composed, as a main component, of the microprocessor (MCPU) 20b adapted to cooperate with a program memory (PMEM) 25B, and the supervisory control circuit part 30B that is composed, as a main component, of the communication control circuit part (SCPU) 30b adapted to cooperate with the auxiliary program memory (PMEM) 35B. The electronic control apparatus 10B is driven to operate by electric power supplied from an external power supply 13 (e.g., a vehicle mounted battery).

A first and a second group of input sensors 11a, 11b, a first and a second group of electric loads 12a, 12b, and an external tool 19 are connected to the exterior of the electronic control apparatus 10B, as in the above-mentioned first embodiment (FIG. 1).

In addition, similar to the above-mentioned first embodiment (FIG. 1), the electronic control apparatus 10B is provided, as an internal configuration related to the main control circuit part 20B and the supervisory control circuit part 30B, with a first and a second input interface circuit 21, 31, a first and a second output interface circuit 22, 32, serial parallel converters 27a, 37a which together constitute a serial communication circuit, a high precision clock signal source 28, a serial interface circuit (tool interface circuit) 29, a power supply circuit 33, and a watchdog timer 40.

A direct memory access controller (hereinafter referred to as a "DMA") 37b is connected between a parallel input and output bus of the serial parallel converter 37a, which constitutes a serial interface circuit, and a data bus of the communication control circuit part (SCPU) 30b.

The DMA 37b is formed in the supervisory control circuit part 30B so as to perform data transfer between itself and a RAM memory 34 for calculation processing without by way of the communication control circuit part 30b.

In addition, a DMA 27b in the main control circuit part 20B is connected between a parallel input and output bus of the serial parallel converter 27a, which constitutes a serial interface circuit, and a data bus of the microprocessor 20b. The DMA 27b is provided so as to perform data transfer between itself and a RAM memory 24 for calculation processing without by way of the microprocessor 20b.

Here, note that a control program (to be described later together with FIG. 13 and FIG. 16), which corresponds to a communication control program, in addition to an input and output control program is stored in the program memory 25B in the main control circuit part 20B.

Moreover, in the auxiliary program memory 35B in the supervisory control circuit part 30B, there are stored, in addition to an input output processing program, a control program (to be described later together with FIG. 14 and FIG. 15), which corresponds to a communication control program, and correct answer information for Q & A diagnosis.

The serial communication circuit comprised of the pair of serial parallel converters 27a, 37a constitutes a full duplex block communication circuit, so that it can transmit and receive downstream traffic information DND from the main control circuit part 20B to the supervisory control circuit part 30B, and upstream traffic information UPD from the supervisory control circuit part 30B to the main control circuit part 20B in a simultaneous manner.

A communication permission signal PMT and a communication synchronization signal CLK1, which are generated by the main control circuit part 20B, will be described later along with FIG. 10.

The communication control circuit part 30b in the supervisory control circuit part 30B is driven to operate by means of a medium speed clock signal CLK2 generated by a low precision clock signal source 38 which is built therein so as to perform a time counting operation.

A fluctuation region of the signal cycle T2 of the medium speed clock signal CLK2 is regulated in such a manner that the signal cycle T2 of the medium speed clock signal CLK2 becomes higher in speed and shorter in period than that of the communication synchronization signal CLK1, and becomes lower in speed and longer in period than that of the signal cycle of a high speed clock signal CLK0.

An error measuring circuit 300B (to be described later together with FIG. 12) in the supervisory control circuit part 30B calculates an error correction coefficient Kn (=T2/T1) by measuring the signal cycle T2 of the medium speed clock signal CLK2 on the basis of the signal cycle T1 of the communication synchronization signal CLK1.

The watchdog timer 40 supervises a first watchdog signal WD1 (pulse train) which is generated by the microprocessor 20b, and generates a reset pulse RST when the pulse width of the first watchdog signal WD1 becomes out of the bounds of an allowable fluctuation range (abnormal), thereby initializing and restarting the main control circuit part 20B and the supervisory control circuit part 30B.

The main control circuit part 20B initializes and restarts the supervisory control circuit part 30B by generating a first reset pulse RST1 when an abnormality or malfunction of the supervisory control circuit part 30B is detected.

On the other hand, the supervisory control circuit part 30B initializes and restarts the main control circuit part 20B by generating a second reset pulse RST2 when an abnormality or malfunction of the main control circuit part 20B is detected.

In addition, the generation cycle of the second watchdog signal WD2 generated by the communication control circuit part (SCPU) 30b is supervised by the microprocessor 20b.

In cases where the generation cycle of the second watchdog signal WD2 is abnormal, the microprocessor 20b generates a first reset pulse RST1, and initializes and restarts the supervisory control circuit part 30B.

Next, reference will be made to a serial communication operation according to the second embodiment of the present invention, as shown in FIG. 9, while referring to a timing chart of FIG. 10 and an explanatory view of FIG. 11.

In FIG. 10(A), the communication permission signal PMT is a logic signal which permits the start of full duplex block communication, and it is transmitted from the main control circuit part 20B to the supervisory control circuit part 30B through an independent control signal line in a periodic manner.

Figure 10:
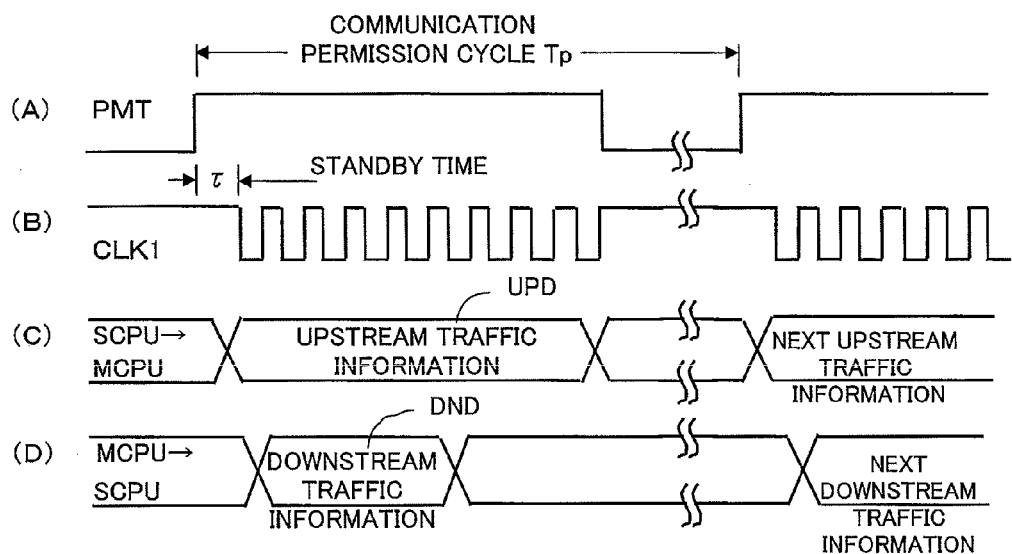
FIG. 10 is a timing chart showing a serial communication operation according to the second embodiment of the present invention.

The communication permission signal (logic signal) PMT becomes a high logic level "H" (or a low logic level "L") in a communication permission period, and becomes a low logic level "L" (or a high logic level "H") in a communication non-permission (disapproval) period, as shown in FIG. 10 (A), so each time the logic level of the communication permission signal PMT is effectively inverted from a low level "L" to a high level "H", the transmission start of a new communication block is permitted.

However, when the fixed logic level of the communication permission signal PMT is maintained, the current communication is completed at the time when communication of a predetermined number of bytes has been completed, and when the logic level of the communication permission signal PMT is inverted before the completion of communication of the predetermined number of bytes, interruption processing of communication data is carried out.

In FIG. 10(B), as the communication synchronization signal CLK1, there are generated at least a number of pulses corresponding to the number of bits of communication information, which are transmitted from the main control circuit part 20B to the supervisory control circuit part 30B through the independent control signal line.

The communication synchronization signal CLK1 is a pulse train signal for a serial communication signal to carry out stepping movement, and the generation of the communication synchronization signal CLK1 is started after the main control circuit part 20B has generated the communication permission signal PMT, with a delay of a predetermined standby time τ.

The communication synchronization signal CLK1 stops the generation of pulses after generating a predetermined number of pulses corresponding to the number of transmitting and receiving bits. However, in cases where the next communication permission signal PMT is generated at an early stage before the generation of the predetermined number of pulses has been completed, the generation of pulses is started again with a delay of the standby time τ while omitting the generation of the remaining pulses.

In FIG. 10(C), the upstream traffic information UPD includes input signal information with respect to the supervisory control circuit part 30B, or setting constants obtained from the main control circuit part 20B, or report information in the form of stored information of a control output, as well as current question information and code checking information, and has a data length of 500 bits, for example.

In FIG. 10(D), the downstream traffic information DND is transmitted from the main control circuit part 20B to the supervisory control circuit part 30B, and includes command information in the form of setting constants or a control output, which is required in the supervisory control circuit part 30B, answer information to question information which has been obtained from the past upstream traffic information UPD, and code checking information, and has a data length of 100 bits, for example.

Accordingly, in order to transmit and receive all the data, it is necessary to generate at least 500 pulses as the communication synchronization signal CLK1, but the communication permission period or cycle Tp of the communication permission signal PMT is 5 msec, for example, and in contrast thereto, the time required to transmit and receive data of 500 bits is 0.5 msec, for example.

Here, note that tag numbers are given to a plurality of pieces of question information, respectively, which are selected irregularly, and pieces of answer information to the plurality of pieces of question information with the same tag number attached thereto is transmitted to the supervisory control circuit part 30B until a plurality of permitted communication cycles have elapsed.

In addition, the standby time τ is several 100 μsec, and within the standby time τ, an AD conversion command is generated to a multi-channel AD converter 36 and the AD conversion of all the channels has been completed.

Figure 11:
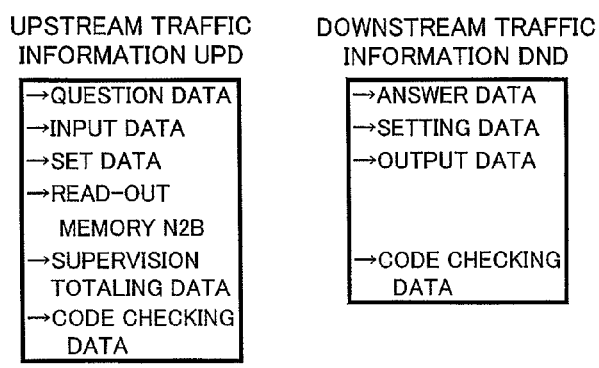
FIG. 11 is an explanatory view showing upstream traffic information and downstream traffic information according to the second embodiment of the present invention.

In FIG. 11, there are shown the specific details of the upstream traffic information UPD and the downstream traffic information DND.

In FIG. 11, the upstream traffic information UPD is the received data which is stored in the RAM memory 24 through upstream communication, and includes question information for Q and A, input signal information obtained from the second group of input sensors 11b, set information to be described later, reverse supervisory information on the calculated result of the error correction coefficient Kn or for calculating the error correction coefficient Kn, supervision totaling information, and code checking information.

Here, note that the value of a read-out stored value N2A (to be described later along with FIG. 12) is transmitted as the reverse supervisory information with respect to the error correction coefficient Kn.

In addition, the downstream traffic information DND is the received data which is stored in the RAM memory 34 through downstream communication, and includes answer information for Q and A, setting information such as control parameters required by the supervisory control circuit part 30B, output signal information with respect to the second group of electric loads 12*b*, and code checking information.

Here, note that the set information in the upstream traffic information UPD is the setting information and the output signal information which have been stored in the RAM memory 34 as the downstream traffic information DND, and by the use of such set information, it can be verified at the side of the main control circuit part 20B whether the setting information and the output signal information have been correctly transmitted.

In the supervisory control circuit part 30B, the correct answer information corresponding to the question information is beforehand stored in the auxiliary program memory 35B at the stage of product shipping, and the communication control circuit part (SCPC) 30*b* supervises the operating state of the microprocessor 20*b* by transmitting question information at random and making a comparison between answer information replied from the microprocessor 20*b* and correct answer information.

On the other hand, by making an intentional wrong answer to the question information from the communication control circuit part 30*b*, the microprocessor 20*b* performs, based on supervision totaling information received, reverse supervision as to whether proper supervisory control is carried out by the supervisory control circuit part 30B.

As a result of this, the supervisory control circuit part 30B initializes and restarts the main control circuit part 20B by generating a second reset pulse RST2 when an abnormality or malfunction of the main control circuit part 20B is detected, whereas the main control circuit part 20B initializes and restarts the supervisory control circuit part 30B by generating a first reset pulse RST1 when an abnormality or malfunction of the supervisory control circuit part 30B is detected.

Next, reference will be made to the detailed construction of the error measuring circuit 300B in the supervisory control circuit part 30B while referring to a block diagram of FIG. 12 together with FIG. 9 through FIG. 11.

Figure 12:
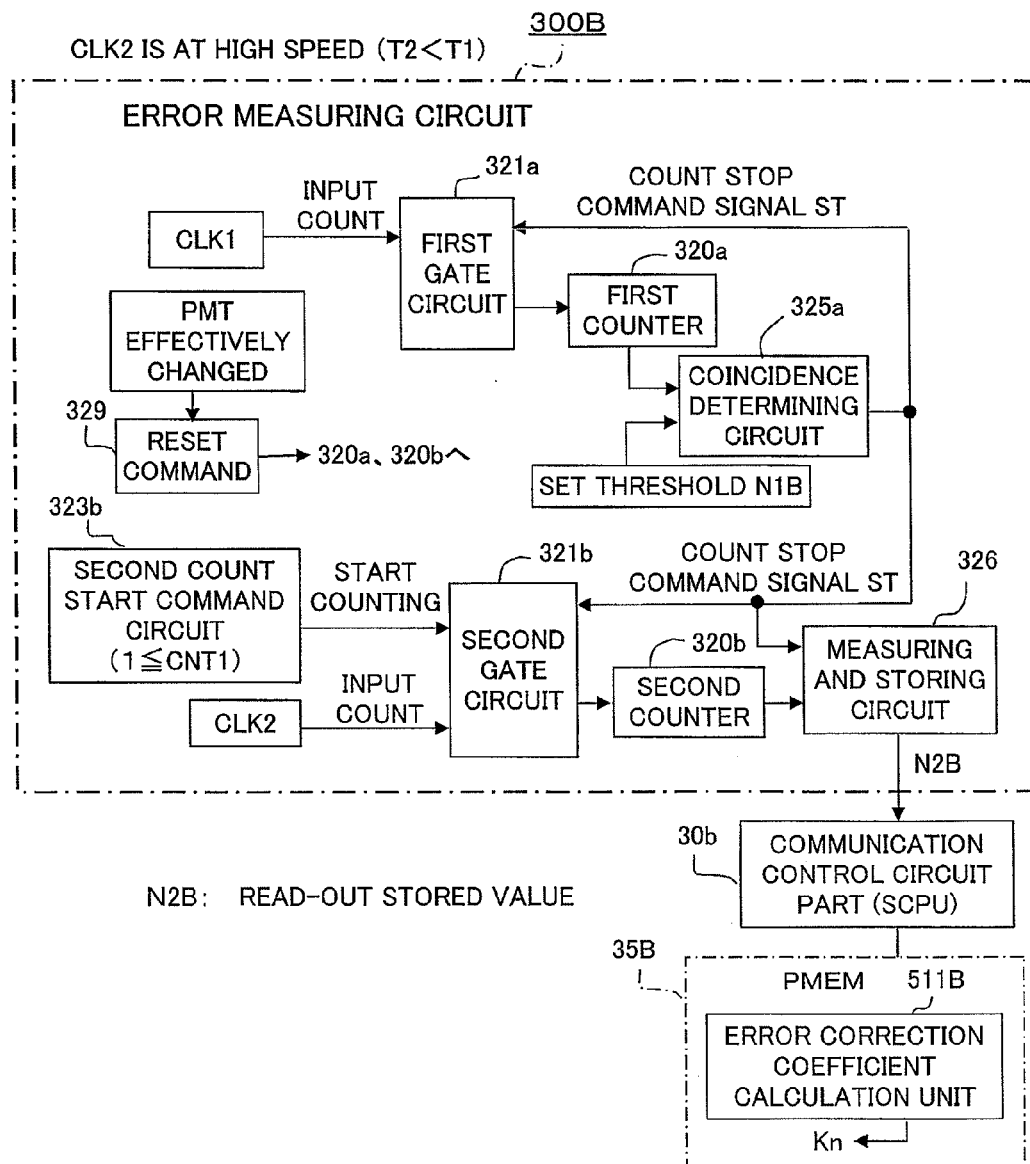
FIG. 12 is a block diagram showing the detailed construction of an error measuring circuit in FIG. 9.

In FIG. 12, those which are similar to the aforementioned ones (see FIG. 4) are denoted by the same reference numerals and characters as those in the aforementioned ones, while omitting a detailed explanation thereof.

In this case, the function of an error correction coefficient calculation unit 511B is included in the auxiliary program memory (PMEM) 35B which cooperates with the communication control circuit part 30*b*.

The error measuring circuit 300B is provided with a first and a second counter 320*a*, 320*b*, a first and a second gate circuit 321*a*, 321*b*, a second count start command circuit 323*b*, a coincidence determining circuit 325*a*, and a measuring and storing circuit 326.

The first counter 320*a* counts, through the first gate circuit 321*a*, the number of times that the communication synchronization signal CLK1 has changed, e.g., from a low logic level "L" to a high logic level "H".

The second counter 320*b* counts, through the second gate circuit 321*b*, the number of times that the medium speed clock signal CLK2 has changed, e.g., from a low logic level "L" to a high logic level "H".

The coincidence determining circuit 325*a* generates a count stop command signal ST thereby to stop the counting operations of the first and second counters 320*a*, 320*b* at the time when the current count value CNT1 of the first counter 320*a* reaches a predetermined set threshold N1B.

The second count start command circuit 323*b* releases or opens the second gate circuit 321*b* in response to a time when the current count value CNT1 of the first counter 320*a* has become equal to or more than "1" (1≦CNT1), thereby permitting the count of the medium speed clock signal CLK2 to be inputted to the second counter 320*b*.

The measuring and storing circuit 326 stores, as a read-out stored value N2B, the current count value CNT2 of the second counter 320*b* at the time when the coincidence determining circuit 325*a* generates the count stop command signal ST.

The communication control circuit part (SCPU) 30*b* includes a control program which becomes the error correction coefficient calculation unit 511B, and calculates, as the error correction coefficient Kn, the ratio of the signal cycle T2 of the medium speed clock signal CLK2 to the signal cycle T1 of the communication synchronization signal CLK1 based on the control program stored in the auxiliary program memory 35B according to the following equation (3).

$$Kn = T2/T1 = (N1B-1)/N2B \quad (3)$$

Here, note that the number or frequency of generation of the medium speed clock signal CLK2 within a period of time "(N1B−1)×T1" in which the current count value CNT1 of the first counter 320*a* is "1 to N1B" corresponds to the read-out stored value N2B, so the following relation holds.

$$(N1B-1) \times T1 \approx N2B \times T2$$

Accordingly, the error correction coefficient Kn is calculated according to the above-mentioned equation (3).

The current count values CNT1, CNT2 of the first and second counters 320*a*, 320*b* are initialized by means of a reset command 329 each time the communication permission signal PMT carries out an effective change in logic level, whereby the calculation of the error correction coefficient Kn is newly performed.

On the other side, the time counting operation of the supervisory control circuit part 30B is performed by counting the frequency of generation of the medium speed clock signal CLK2.

For example, in cases where first answer information is received after the lapse of a plurality of communication cycles after the transmission of first question information, the supervisory control circuit part 30B counts the frequency of generation of the medium speed clock signal CLK2 in order to determine whether the time elapsed during this period of time has exceeded a permitted timeout determination time Td (i.e., abnormal).

At this time, if a count value N until the reception of a reply fulfills a relation of N×T2<Td (i.e., N<Td/T2), it means that the reply has been obtained within a predetermined time, and it is determined that a reception state is normal.

However, the signal cycle T2 of the medium speed clock signal CLK2 is greatly changed or fluctuated due to the change of an individual variation and an environmental temperature, so correction is carried out by the use of the error correction coefficient Kn according to the following equation (4).

$$N < Td/T2 = Td/(Kn \times T1) \quad (4)$$

On the other hand, it is verified by both of the main control circuit part 20B and the supervisory control circuit part 30B whether the error correction coefficient Kn deviates from an assumed variation range.

First, in cases where the verification is carried out at the side of the main control circuit part 20B, the value of the error correction coefficient Kn which has been arithmetically calculated by the communication control circuit part (SCPU) 30*b* in the supervisory control circuit part 30B is transmitted to the main control circuit part 20B as a part of the upstream traffic information UPD, and in the main control circuit part 20B, it is determined whether the value of the error correction coefficient Kn thus calculated and transmitted is a value (abnormal) out of a predetermined range (allowable fluctuation range).

Alternatively, the read-out stored value N2B which has been written into the measuring and storing circuit 326 in the supervisory control circuit part 30B is transmitted to the main control circuit part 20B, and in the main control circuit part 20B, after execution of the arithmetic calculation according to the above-mentioned equation (3), it is also possible to determine whether the read-out stored value N2B thus transmitted is a value (abnormal) out of a predetermined range.

Here, note that the value of the error correction coefficient Kn becomes an abnormal value in cases where the signal cycle T1 of the communication synchronization signal CLK1 is abnormal, or in cases where the signal cycle T2 of the medium speed clock signal CLK2 is abnormal, but in cases where the high speed clock signal CLK0 on which the communication synchronization signal CLK1 is based becomes abnormal, the detection of a malfunction can also be made by the watchdog timer 40.

Accordingly, first of all, the communication synchronization signal CLK1 is presupposed as being normal, and if the value of the error correction coefficient Kn is abnormal, the supervisory control circuit part 30B is initialized and restarted by the first reset pulse RST1 which is generated by the main control circuit part 20B.

However, assuming that the communication synchronization signal CLK1 becomes abnormal and normal communication is impossible, a determination is made at the side of the supervisory control circuit part 30B as to whether the value of the error correction coefficient Kn is normal, and if an abnormal state continues, the second reset pulse RST2 is generated so that the main control circuit part 20B is thereby initialized and restarted.

Next, reference will be made to an operation according to this second embodiment of the present invention as shown in FIG. 9.

First of all, when the external power supply 13 is connected to the electronic control apparatus 10B through a power supply switch (not shown), the microprocessor 20b in the main control circuit part 20B performs driving control of the first and second group of electric loads 12a, 12b in response to the operating states of the first and second group of input sensors 11a, 11b and the contents of the control program in the program memory 25B.

The supervisory control circuit part 30B and the watchdog timer 40 supervise the control operation of the main control circuit part 20B, and generate a second reset pulse RST2 and a reset pulse RST if the main control circuit part 20B is abnormal, thereby initializing and restarting the main control circuit part 20B.

On the other hand, the main control circuit part 20B reversely supervises the supervisory control circuit part 30B, and initializes and restarts the supervisory control circuit part 30B by generating a first reset pulse RST1 if the supervisory control circuit part 30B is abnormal.

In addition, in cases where the frequency of occurrence of abnormality is high, the operation of the vehicle is shifted to a safety driving mode in which the driving of a specific electric load is stopped, and in cases where the occurrence of abnormality continues, a notification of the abnormality is carried out and all other power is stopped.

In the following, reference will be made to a communication operation according to the second embodiment of the present invention, while referring to flow charts of FIG. 13 through FIG. 16 together with FIG. 9 through FIG. 12.

However, in this case, the differences from the above-mentioned first embodiment are only as follows: the communication permission signal PMT is changed from an alternating signal (the communication permission signal ALT) to a logic signal; the supervisory control circuit part 30B is provided with the communication control circuit part (SCPU) 30b; and the error correction coefficient Kn is calculated by the communication control circuit part 30b.

Accordingly, in FIG. 13 through FIG. 16, those which are similar to the aforementioned processes (see FIG. 5 through FIG. 8) are denoted by the same numerals and characters as those in the aforementioned ones, while omitting a detailed explanation thereof.

First of all, reference will be made to a transmitting operation of the microprocessor (MCPU) 20b in the main control circuit part 20B, while referring to FIG. 13.

Figure 13:
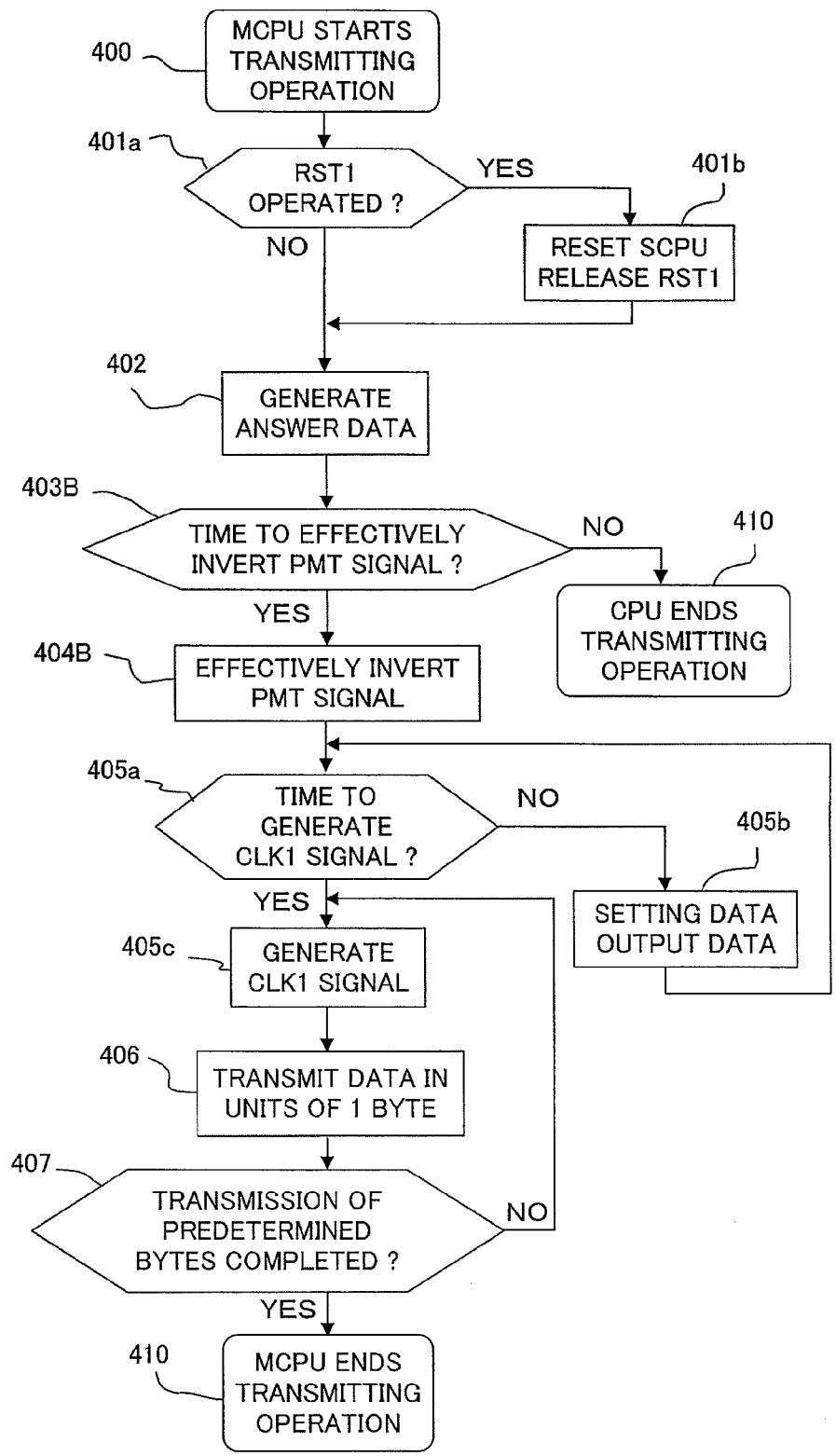
FIG. 13 is a flow chart showing a transmitting operation of a main control circuit part in FIG. 9.

In FIG. 13, when starting an operation of transmitting information to the supervisory control circuit part 30B (step 400), following the same steps 401a, 401b and 402 as those in the above-mentioned FIG. 5, the microprocessor 20b determines whether it is the time to effectively invert the logic level of the communication permission signal (logic signal) PMT from a low level "L" to a high level "H" (step 403B).

In step 403B, when it is determined that it is not the time to effectively invert the logic level from "L" to "H" (that is, NO), the control flow shifts to operation end processing (step 410).

On the other hand, in step 403B, when it is determined that it is the time to effectively invert the logic level from "L" to "H" (that is, YES), the logic level of the communication permission signal (logic signal) PMT is effectively inverted from "L" to "H" (step 404B), and the control flow shifts to step 405a.

Hereinafter, the same steps 405a through 405c, 406 and 407 as those in the above-mentioned FIG. 5 are carried out, and then, the transmitting processing of FIG. 13 by the microprocessor 20b is ended (step 410).

Next, reference will be made to a receiving operation by the communication control circuit part (SCPU) 30b in the supervisory control circuit part 30B, while referring to FIG. 14.

Figure 14:
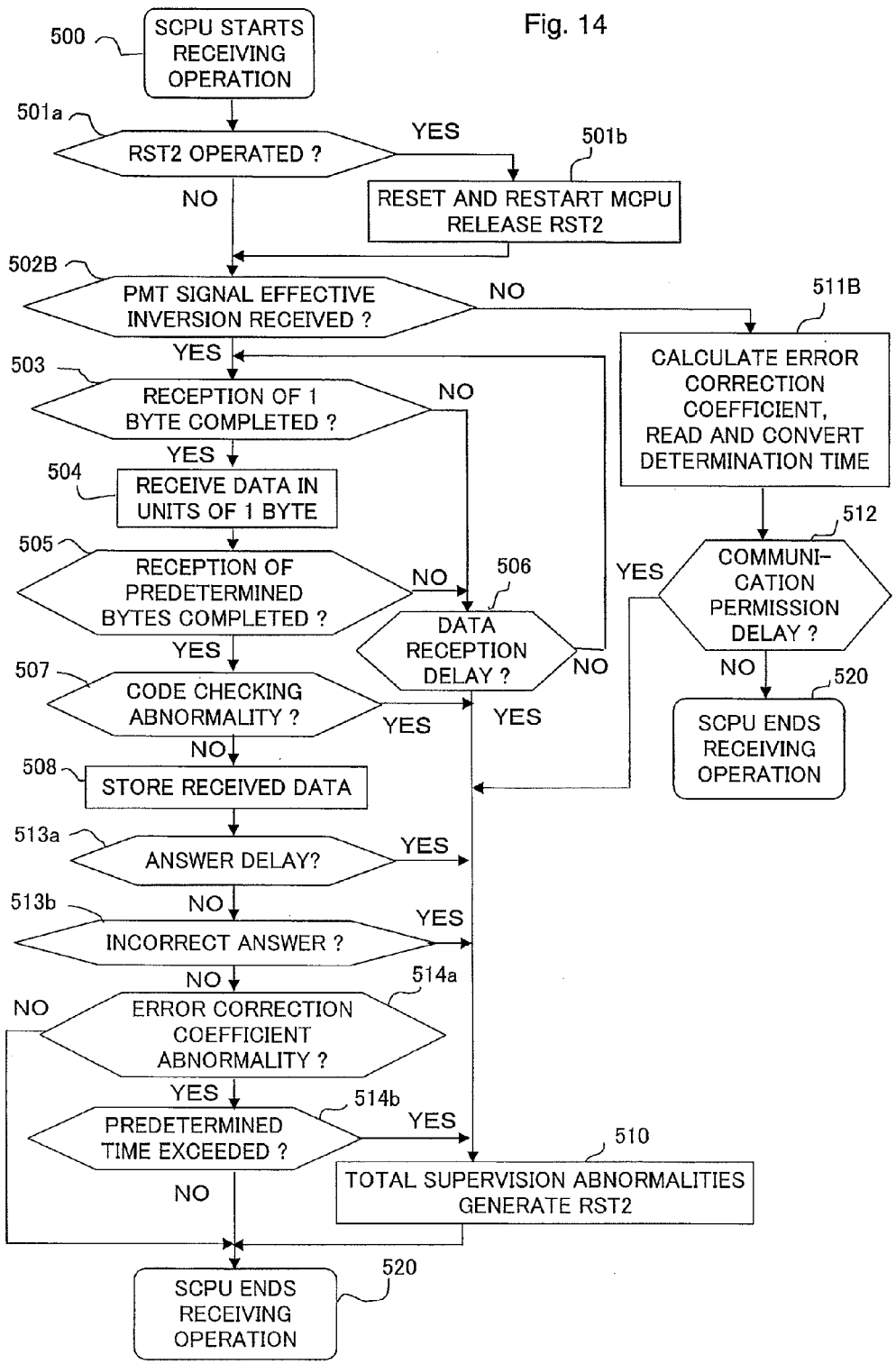
FIG. 14 is a flow chart showing a receiving operation of a supervisory control circuit part in FIG. 9.

In FIG. 14, when starting an operation of receiving information from the main control circuit part 20B (step 500), following the same steps 501a, 501b as those in the above-mentioned FIG. 6, the communication control circuit part 30b determines whether the logic level of the communication permission signal (logic signal) PMT transmitted from the main control circuit part 20B has been effectively inverted from a low level "L" to a high level "H" (step 502B).

In step 502B, when it is determined that it is not immediately after the logic level of the communication permission signal PMT has been effectively inverted from "L" to "H" (that is, NO), the control flow shifts to step 511B, where the error correction coefficient Kn is calculated based on the read-out stored value N2B obtained from the measuring and storing circuit 326 and the value of the set threshold N1B (known) according to the above-mentioned equation (3), and at the same time, the normal range of the count value of a delay determination counter (not shown), which is provided for performing timeout check in the later-mentioned steps 506, 512, 513a and 514b, is corrected through conversion based on the above-mentioned equation (4).

On the other hand, in step 502B, when it is determined that it is immediately after the logic level of the communication permission signal PMT has been effectively inverted from "L" to "H" (that is, YES), the control flow shifts to the following determination processing (step 503).

Hereinafter, the same steps 503 through 508, 510, 513a, 513b, 514a and 514b as those in the above-mentioned FIG. 6 are carried out, and then, the receiving processing of FIG. 14 by the communication control circuit part (SCPU) 30b is ended (step 520).

Next, reference will be made to a transmitting operation by the communication control circuit part (SCPU) 30b, while referring to FIG. 15.

Figure 15:
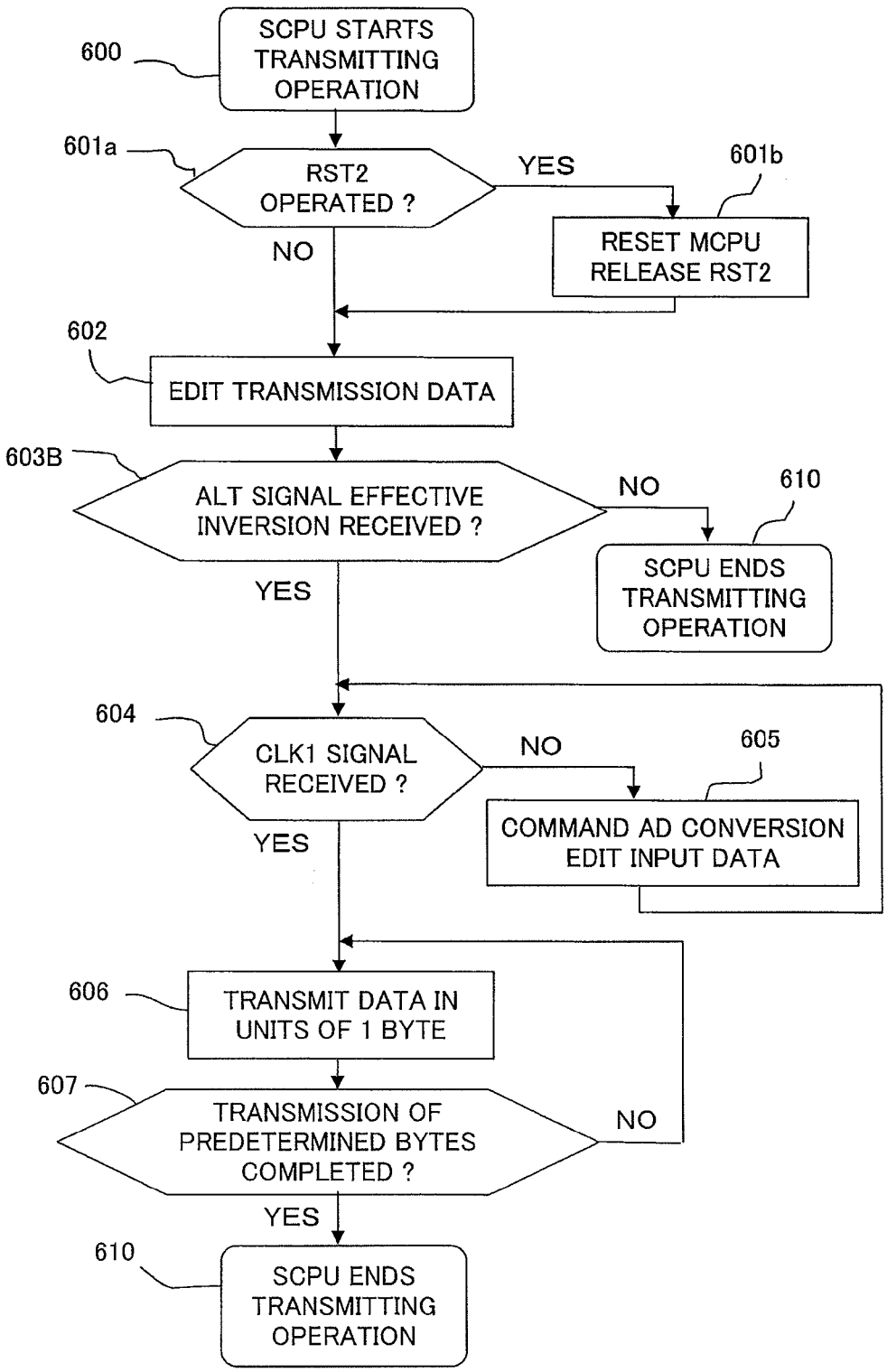
FIG. 15 is a flow chart showing a transmitting operation of the supervisory control circuit part in FIG. 9.

In FIG. 15, when starting an operation of transmitting information to the main control circuit part 20B (step 600), following the same steps 601a, 601b and 602 as those in the above-mentioned FIG. 7, the communication control circuit part 30b determines whether the logic level of the communication permission signal (logic signal) PMT transmitted from the main control circuit part 20B has been effectively inverted from a low level "L" to a high level "H" (step 603B).

In step 502B, when it is determined that it is not immediately after the logic level of the communication permission signal PMT has been effectively inverted from "L" to "H" (that is, NO), the control flow shifts to operation end processing similar to the above-mentioned one (step 610).

On the other hand, in step 603B, when it is determined that the logic level of the communication permission signal PMT has been effectively inverted from "L" to "H" (that is, YES), the control flow shifts to transmission information editing processing similar to the above-mentioned one (step 604).

Hereinafter, the same steps 604 through 607 as those in the above-mentioned FIG. 7 are carried out, and then, the transmitting processing of FIG. 15 by the communication control circuit part (SCPU) 30b is ended (step 610).

Next, reference will be made to a receiving operation of the microprocessor (MCPU) 20b, while referring to FIG. 16.

Figure 16:
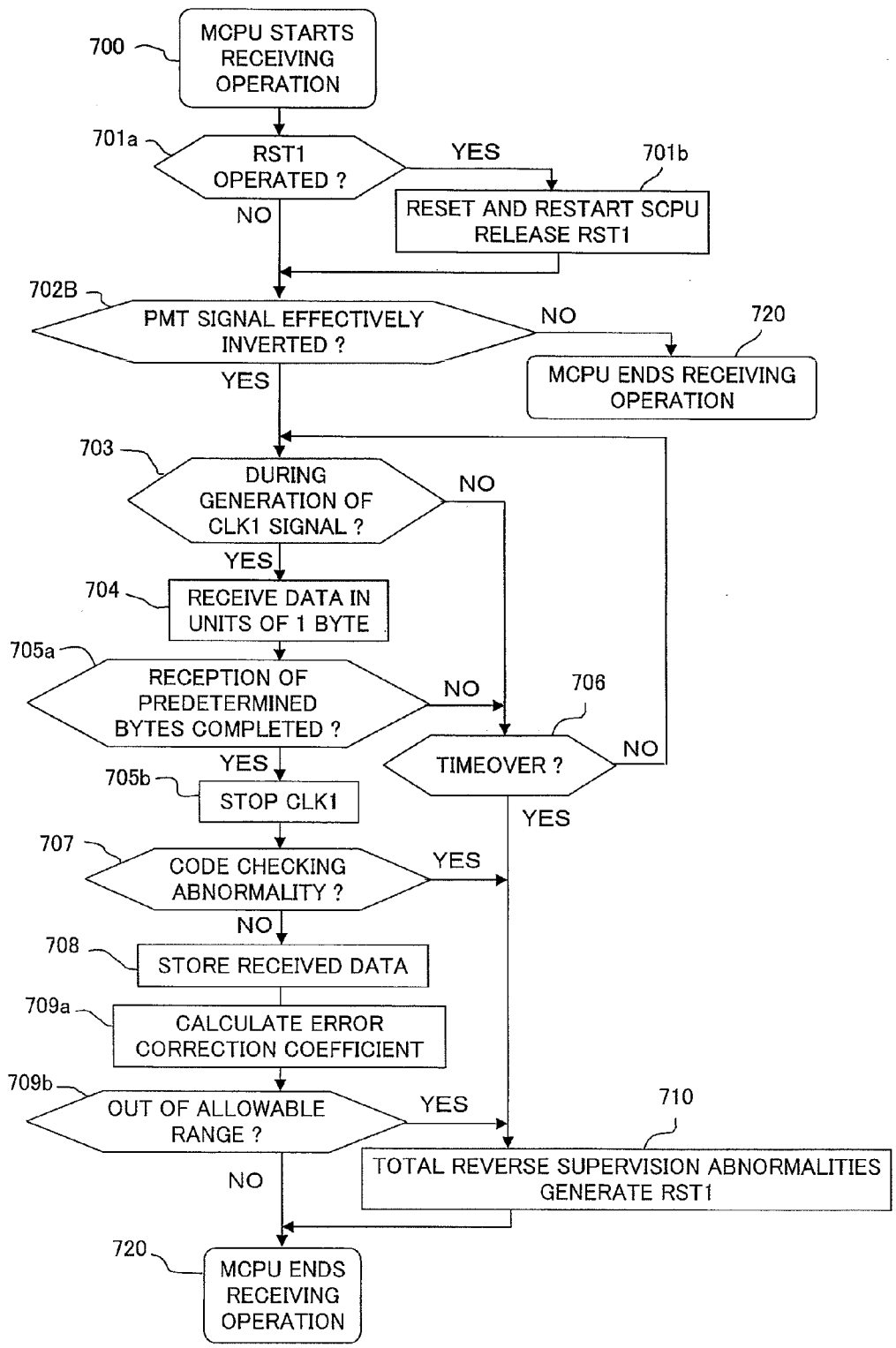
FIG. 16 is a flow chart showing a receiving operation of the main control circuit part in FIG. 9.

In FIG. 16, when starting an operation of receiving information from the supervisory control circuit part 30B (step 700), following the same steps 701a, 701b as those in the above-mentioned FIG. 8, the microprocessor 20b determines, according to step 404B in FIG. 13, whether the logic level of the communication permission signal (logic signal) PMT has been effectively inverted from a low level "L" to a high level "H" (step 702B).

In step 702B (standby step), when it is determined that it is not immediately after the logic level of the communication permission signal PMT has been effectively inverted from "L" to "H" (that is, NO), the control flow shifts to operation end processing (step 720).

On the other hand, when it is determined that it is immediately after the logic level of the communication permission signal PMT has been effectively inverted from "L" to "H" (that is, YES), the control flow shifts to determination processing similar to the above-mentioned one (step 703).

Hereinafter, the same steps 703 through 710 as those in the above-mentioned FIG. 8 are carried out, and then, the receiving processing of FIG. 16 by the microprocessor (MCPU) 20b is ended (step 720).

Here, note that in FIG. 9, the communication permission signal PMT in the form of a logic signal is used in place of the communication permission signal ALT in the form of an alternating signal in the above-mentioned FIG. 1, and the communication control circuit part (SCPU) 30b is used in place of the communication control circuit part (LCU) 30a, but the logical circuit LCU in the above-mentioned FIG. 1 can also be used as a communication control circuit part in the supervisory control circuit part 30B, in place of the auxiliary microprocessor SCPU.

In cases where the communication control circuit part 30a (FIG. 1) in the form of the logical circuit LCU is used in place of the communication control circuit part 30b in the supervisory control circuit part 30B, it becomes difficult to change control specifications for the supervisory control circuit part 30B, but the auxiliary microprocessor SCPU and the auxiliary program memory 35B can be made unnecessary, so it is possible to construct an inexpensive integrated circuit device.

On the other hand, as shown in FIG. 9, in cases where the auxiliary microprocessor SCPU is used as the communication control circuit part 30b, it is possible to change the operation specifications of the supervisory control circuit part 30B relatively easily by changing the contents of the auxiliary program memory 35B.

In addition, in the above-mentioned error measuring circuit 300A (FIG. 4), the medium speed clock signal CLK2 operates at a lower speed than the communication synchronization signal CLK1 does (i.e., T1<T2), but in contrast to this, in the error measuring circuit 300B of the second embodiment (FIG. 12) of the present invention, the medium speed clock signal CLK2 operates at a higher speed than the communication synchronization signal CLK1 does (i.e., T2<T1).

Figure 17:
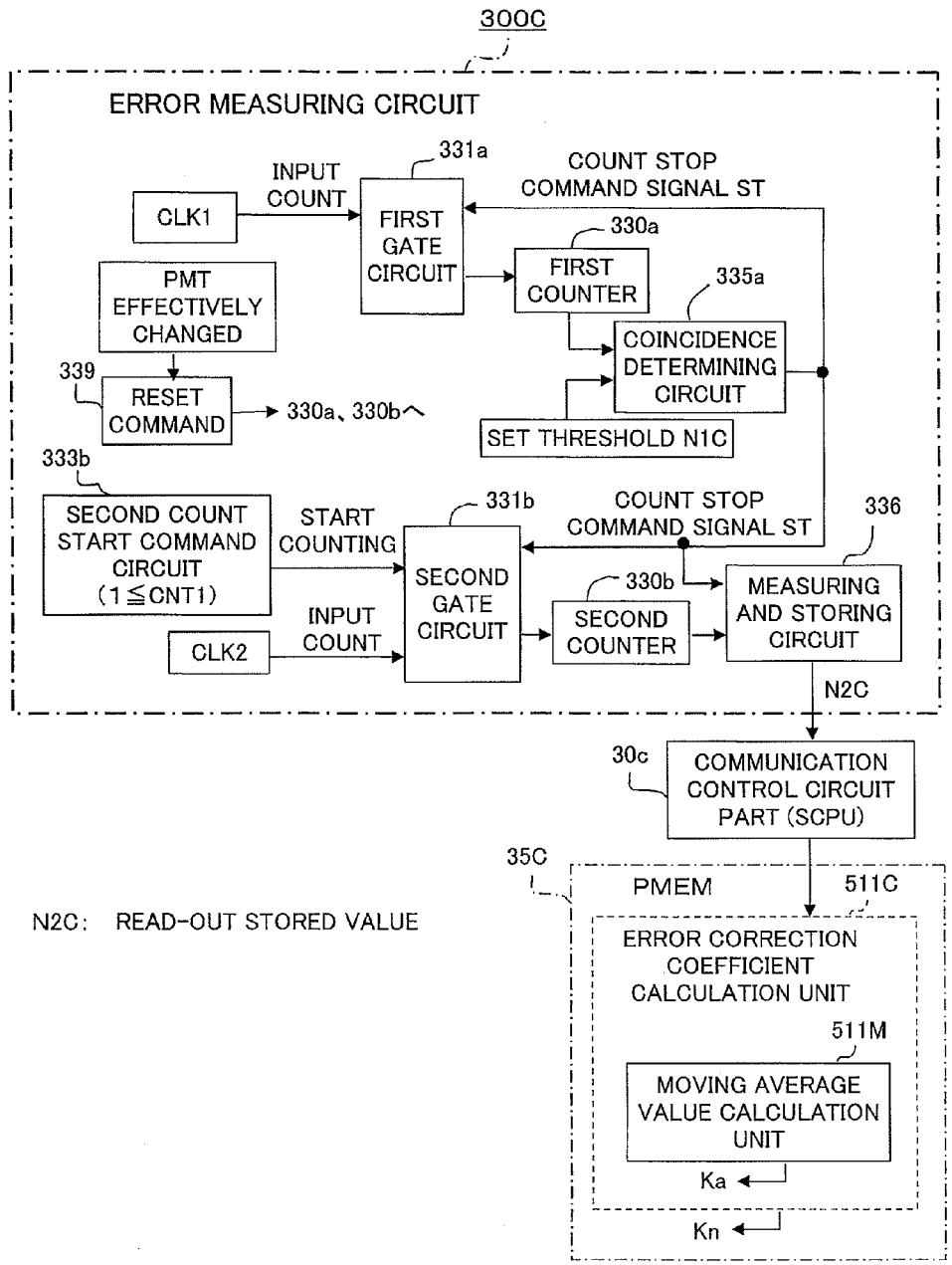
FIG. 17 is a block diagram showing another construction example of the error measuring circuit according to the second embodiment of the present invention.

Here, the signal cycle T2 of the medium speed clock signal CLK2 fluctuates to values around the signal cycle T1 of the communication synchronization signal CLK1, and the maximum of the signal cycle T2 is higher in speed and lower in period than the serial parallel conversion cycle of the serial parallel converters 27a, 37a, but in cases where the minimum of the signal cycle T2 is lower in speed and longer in period than the signal cycle of the high speed clock signal CLK0, an error measuring circuit 300C shown in FIG. 17 can be used.

FIG. 17 is a block diagram showing the detailed construction of the error measuring circuit 300C (another example).

In FIG. 17, the error measuring circuit 300C is provided with the same components as those in the above-mentioned embodiment (see FIG. 12).

In this case, the function of an error correction coefficient calculation unit 511C, which serves to calculate the error correction coefficient Kn, is included in an auxiliary program memory (PMEM) 35C which cooperates with the communication control circuit part 30c.

In addition, the auxiliary program memory 35C is provided, in addition to the error correction coefficient calculation unit 511C, with a control program which becomes a moving average value calculation unit 511M for calculating a moving average value Ka.

In the error measuring circuit 300C, a first counter 330a calculates, through a first gate circuit 331a, the number of times that the communication synchronization signal CLK1 has changed, e.g., from a low logic level "L" to a high logic level "H".

A second counter 330b counts, through a second gate circuit 331b, the number of times that the medium speed clock signal CLK2 has changed, e.g., from a low logic level "L" to a high logic level "H".

A coincidence determining circuit 325a generates a count stop command signal ST thereby to stop the counting operations of the first and second counters 330a, 330b at the time when the current count value CNT1 of the first counter 330a reaches a predetermined set threshold N1C.

A second count start command circuit 333b releases or opens the second gate circuit 331b at the time when the current count value CNT1 of the first counter 330a has become equal to or more than "1" (1≦CNT1), thereby permitting the count of the medium speed clock signal CLK2 to be inputted to the second counter 330b.

A measuring and storing circuit 336 stores, as a read-out stored value N2C, the current count value CNT2 of the second counter 330b at the time when a coincidence determining circuit 335a generates the count stop command signal ST.

The communication control circuit part (SCPU) 30c includes a control program which becomes the error correction coefficient calculation unit 511C, and calculates, as the error correction coefficient Kn, the ratio of the signal cycle T2 of the medium speed clock signal CLK2 to the signal cycle T1 of the communication synchronization signal CLK1 based on the control program stored in the auxiliary program memory 35C according to the following equation (5).

$$Kn = T2/T1 = (N1C-1)/N2C \quad (5)$$

Here, note that a period in which the current count value CNT1 of the first counter 330a is "1 to N1C" is (N1C−1)×T1, and the frequency of generation of the medium speed clock signal CLK2 within this period corresponds to the read-out stored value N2C, so the following relation is established.

$$(N1C-1) \times T1 \approx N2C \times T2$$

Accordingly, the error correction coefficient Kn is calculated according to the above-mentioned equation (5).

The current count values CNT1, CNT2 of the first and second counters 330a, 330b are initialized by means of a reset command 339 each time the communication permission signal PMT carries out an effective change in logic level, whereby the calculation of the error correction coefficient Kn is newly performed.

Here, in cases where the medium speed clock signal CLK2 operates at a higher speed than the communication synchronization signal CLK1 does (i.e., T2<T1), as in the error measuring circuit 300B of FIG. 12, a relation of N2C>N1C exists, and hence, even if the second counter 330b has counted a count less by 1 due to the timing of counting, a relative error becomes a value of 1/N2C<1/N1C.

However, in cases where the medium speed clock signal CLK2 operates at a lower speed than the communication synchronization signal CLK1 does (i.e., T1<T2), as in the above-mentioned error measuring circuit 300A (FIG. 4), a relation of N2C<N1C exists, and hence, if the second counter 330b has counted a count less by 1 due to the timing of counting, a relative error becomes a value of 1/N2C>1/N1C.

For example, in cases where the first counter 330a is a four-bit counter and its set threshold N1C is set to 15 (N1C=15), it is possible to count a count of 63 as the read-out stored value N2C by using a six-bit counter as the second counter 330b, but when the medium speed clock signal CLK2 becomes low speed, a calculation error of the error correction coefficient Kn becomes large.

Accordingly, in order to avoid an increase of the calculation error, the communication control circuit part (auxiliary microprocessor SCPU) 30c shown in FIG. 17 cooperates with a moving average value calculation unit 511M in the auxiliary program memory 35C to calculate an average value of the error correction coefficient Kn for the latest or last several ones as a moving average value Ka, and the moving average value Ka thus calculated is used as an error correction coefficient.

Hereinafter, the count value N of the medium speed clock signal CLK2 corresponding to the timeout determination time Td is corrected through conversion according to the following equation (6) by the use of the moving average value Ka.

$$N < Td/T2 = Td/(Ka \times T1) \quad (6)$$

As described above, the electronic control apparatus 10B according to the second embodiment (FIG. 9 through FIG. 17) of the present invention is comprised of the main control circuit part 20B and the supervisory control circuit part 30B, both of which are mutually connected in series with each other by means of the serial parallel converters 27a, 37a, wherein the first and second group of electric loads 12a, 12b are driven and controlled in response to the operating states of the first and second group of input sensors 11a, 11b and in response to the input and output control program stored in the program memory 25B.

The main control circuit part 20B is provided with the microprocessor 20b that is operated by means of the high speed clock signal CLK0, and the program memory 25B that cooperates with the microprocessor 20b, wherein the downstream traffic information DND, which includes the driving control signal for the second group of electric loads 12b, the communication synchronization signal CLK1 which is obtained by frequency dividing the high speed clock signal CLK0, and the communication permission signal PMT, are periodically transmitted to the supervisory control circuit part 30B.

The supervisory control circuit part 30B is provided with the clock signal source 38 (clock signal generating circuit) that is independent of the high speed clock signal CLK0, and the communication control circuit part 30b that is driven to operate by means of the medium speed clock signal CLK2 generated from the clock signal source 38, wherein the upstream traffic information UPD including an input supervisory signal which responds to the operating state of the second group of input sensors 11b is periodically transmitted to the main control circuit part 20B from a time point of reception of the communication permission signal PMT.

In addition, the supervisory control circuit part 30B is provided with the error measuring circuit 300B or 300C for calculating the error correction coefficient Kn corresponding to the individual variation and the variation over time of the medium speed clock signal CLK2 by making a relative comparison between the signal cycle T1 of the communication synchronization signal CLK1 and the signal cycle T2 of the medium speed clock signal CLK2 in a periodic manner, and supervises and measures the receiving interval of the specific supervisory signal based on the medium speed clock signal CLK2 and the error correction coefficient Kn in a periodic manner.

The receiving interval of the specific supervisory signal is the receiving interval of the communication permission signal PMT, or the receiving interval of the downstream traffic information DND, or the receiving interval of the answer information periodically transmitted by means of the downstream traffic information DND in response to the question information periodically transmitted by means of the upstream traffic information UPD.

Moreover, the supervisory control circuit part 30B transmits the reverse supervisory information, which is the calculated result of the error correction coefficient Kn or the measurement result with respect to the clock signal cycle required in order to calculate the error correction coefficient Kn, to the main control circuit part 20B as a part of the upstream traffic information UPD, and at the same time, generates the second reset pulse RST2 for initializing and restarting the main control circuit part 20B at the time when the result of the supervision and measurement of the receiving interval of the specific supervisory signal exceeds a predetermined allowable upper limit value.

The fluctuation region of the signal cycle T2 of the medium speed clock signal CLK2 has its allowable variation fluctuation range restricted to a relation in which the signal cycle T2 of the medium speed clock signal CLK2 is lower in speed and longer in period as compared with the signal cycle T0 of the high speed clock signal CLK0, and at the same time, is higher in speed and shorter in period than the signal cycle T1 of the communication synchronization signal CLK1.

In this manner, the signal cycle T2 of the medium speed clock signal CLK2 is set to be between the signal cycle T0 of the high speed clock signal CLK0 and the signal cycle T1 of the communication synchronization signal CLK1, whereby it is possible to avoid the signal cycle T1 of the communication synchronization signal CLK1 from becoming between the maximum and the minimum of the signal cycle T2 of the medium speed clock signal CLK2.

Accordingly, the control flow of the communication control circuit part 30*b* is simplified, and at the same time, it is possible to avoid communication traffic congestion from occurring due to a response delay at the side of the communication control circuit part 30*b*.

In addition, the error measuring circuit 300B of FIG. 12 is provided with the first counter 320*a* that calculates the frequency of generation of the communication synchronization signal CLK1, the second counter 320*b* that calculates the frequency of generation of the medium speed clock signal CLK2, the coincidence determining circuit 325*a* that generates the count stop command signal ST at the time when the current count value CNT1 of the first counter 320*a* reaches the predetermined set threshold N1B, the first gate circuit 321*a* that is formed in a count input circuit of the first counter 320*a*, the second gate circuit 321*b* that is formed in a count input circuit of the second counter 320*b*, and the measuring and storing circuit 326 that stores the current count value of the second counter 320*b* as the read-out stored value N2B at the time when the count stop command signal ST is generated.

The first gate circuit 321*a* prohibits the operation of counting the communication synchronization signal CLK1 at the time of the generation of the count stop command signal ST.

The second gate circuit 321*b* permits counting of the medium speed clock signal CLK2 by means of the second counter 320*b* at the time when the first counting of the first counter 320*a* is started, and prohibits the counting operation of the second counter 320*b* at the time when the count stop command signal ST is generated.

The error correction coefficient calculation unit 511B, which cooperates with the error measuring circuit 300B calculates the error correction coefficient Kn, which is the ratio of the signal cycle T2 of the medium speed clock signal CLK2 to the signal cycle T1 of the communication synchronization signal CLK1, from equation (3): $Kn=T2/T1=(N1B-1)/N2B$, by the use of the read-out stored value N2B of the measuring and storing circuit 326 which is the frequency of generation of the medium speed clock signal CLK2 at the time when the communication synchronization signal CLK1 has been generated a frequency (number of times) corresponding to the set threshold N1B.

In this manner, by measuring the signal cycle T2 of the medium speed clock signal CLK2 by counting how many times the medium speed clock signal CLK2 has been generated within a period of time in which the communication synchronization signal CLK1 has been generated a prescribed number of times, the medium speed clock signal CLK2 is counted by means of the second counter 320*b* from the time immediately after the first counter 320*a* has counted the first communication synchronization signal CLK1.

Accordingly, the second counter 320*b* counts the first medium speed clock signal CLK2 without fail by the time the current count value CNT1 of the first counter 320*a* becomes "2", thus making it possible to prevent the generation of a count error due to a variation in count start timing.

Further, each time the communication permission signal PMT is generated, the current count values CNT1, CNT2 of the first and second counters 320*a*, 320*b* are reset, the stored information by the measuring and storing circuit 326 is updated in a sequential manner, and the error correction coefficient Kn is newly calculated.

In this manner, by calculating the error correction coefficient Kn in a repeated manner, it is possible to update and calculate the exact error correction coefficient Kn corresponding to the variation over time of the signal cycle T2 of the medium speed clock signal CLK2 due to an environmental temperature change.

In addition, the supervisory control circuit part 30B is provided with the error measuring circuit 300B, the communication control circuit part 30*b* that is comprised of an auxiliary microprocessor SCPU, and the auxiliary program memory 35B that has stored a control program for arithmetically calculating the error correction coefficient Kn and correct answer information corresponding to question information.

The communication control circuit part 30*b* transmits an input supervisory signal, which responds to the operating state of the second group of input sensors 11*b*, and question information to the main control circuit part 20B, and at the same time, receives a driving control signal for the second group of electric loads 12*b* and answer information generated by the main control circuit part 20B, whereby it makes a comparison between the answer information and correct answer information corresponding to the question information, and generates the second reset pulse RST2 for initializing and restarting the main control circuit part 20B in cases where the answer information is an incorrect answer.

In this manner, by constituting the communication control circuit part 30*b* in the supervisory control circuit part 30B from an auxiliary microprocessor SCPU, it is possible to construct the control program in the communication control circuit part (auxiliary microprocessor SCPU) 30*b* so as prevent the generation of a response delay and communication traffic congestion if the signal cycle T2 of the medium speed clock signal CLK2 is higher in speed (shorter in period) than the signal cycle T1 of the communication synchronization signal CLK1.

In addition, control specifications of the supervisory control circuit part 30B can be easily changed by changing the contents of the auxiliary program memory (PMEM) 35B.

Moreover, the error measuring circuit 300C of FIG. 17 is provided with the first counter 330*a* that calculates the frequency of generation of the communication synchronization signal CLK1, the second counter 330*b* that calculates the frequency of generation of the medium speed clock signal CLK2, the coincidence determining circuit 335*a* that generates the count stop command signal ST at the time when the current count value CNT1 of the first counter 330*a* reaches the predetermined set threshold N1C, the first gate circuit 331*a* that is formed in a count input circuit of the first counter 330*a*, the second gate circuit 331*b* that is formed in a count input circuit of the second counter 330*b*, and the measuring and storing circuit 336 that stores the current count value of the second counter 330*b* as the read-out stored value N2C at the time when the count stop command signal ST is generated.

The first gate circuit 331*a* prohibits the operation of counting the communication synchronization signal CLK1 at the time of the generation of the count stop command signal ST.

The second gate circuit 331*b* permits counting of the medium speed clock signal CLK2 by means of the second counter 330*b* at the time when the first counting of the first counter 330*a* is started, and prohibits the counting operation of the second counter 330*b* at the time when the count stop command signal ST is generated.

The communication control circuit part (auxiliary microprocessor SCPU) 30c cooperates with the moving average value calculation unit 511M in the auxiliary program memory 35C to calculate the error correction coefficient Kn, which is the ratio of the signal cycle T2 of the medium speed clock signal CLK2 to the signal cycle T1 of the communication synchronization signal CLK1, from equation (5): Kn=T2/T1=(N1C−1)/N2C, by the use of the read-out stored value N2C which is the frequency of generation of the medium speed clock signal CLK2 at the time when the communication synchronization signal CLK1 has been generated a frequency (number of times) corresponding to the set threshold N1C.

Each time the communication permission signal PMT is generated, the current count values CNT1, CNT2 of the first and second counters 330a, 330b are reset, the stored information by the measuring and storing circuit 336 is updated in a sequential manner, and the communication control circuit part 30c calculates an average value of a plurality of latest ones of the error correction coefficient Kn as the moving average value Ka.

In this manner, by measuring the signal cycle T2 of the medium speed clock signal CLK2 by counting how many times the medium speed clock signal CLK2 has been generated within a period of time in which the communication synchronization signal CLK1 has been generated a prescribed number of times, the moving average value Ka of the plurality of times of error correction coefficient Kn is calculated so as to remove a counting error due to a phase difference between the medium speed clock signal CLK2 and the communication synchronization signal CLK1.

As a result of this, even if the numbers of bits of the first and second counters 330a, 330b are small, it is possible to eliminate the generation of a counting error due to a variation in count start timing.

In addition, the error correction coefficient Kn is calculated in a repeated manner, so it is possible to update and calculate the exact error correction coefficient Kn in response to the variation over time of the signal cycle T2 of the medium speed clock signal CLK2 due to an environmental temperature change.

What is claimed is:

1. An electronic control apparatus comprising:
a main control circuit part and a supervisory control circuit part, both of which are mutually connected in series with each other by means of serial parallel converters, wherein
a first and a second group of electric loads are driven and controlled in response to the operating states of a first and a second group of input sensors and in response to an input and output control program stored in a program memory;
said main control circuit part is provided with a microprocessor that is operated by means of a high speed clock signal, and said program memory that cooperates with said microprocessor, and at the same time,
periodically transmits downstream traffic information, which includes a driving control signal for said second group of electric loads, a communication synchronization signal which is obtained by frequency dividing said high speed clock signal, and a communication permission signal, to said supervisory control circuit part;
said supervisory control circuit part is provided with a communication control circuit part that is driven to operate by means of a medium speed clock signal which is independent of said high speed clock signal and which is generated by a clock signal generation circuit, and said supervisory control circuit part periodically transmits upstream traffic information including an input supervisory signal, which responds to the operating state of said second group of input sensors, to said main control circuit part from a time point of reception of said communication permission signal;
said supervisory control circuit part is provided with an error measuring circuit for calculating an error correction coefficient corresponding to an individual variation and a variation over time of said medium speed clock signal by making a relative comparison between a signal cycle of said communication synchronization signal and a signal cycle of said medium speed clock signal in a periodic manner, and supervises and measures a receiving interval of a specific supervisory signal based on said medium speed clock signal and said error correction coefficient in a periodic manner;
the receiving interval of said specific supervisory signal is a receiving interval of said communication permission signal, or a receiving interval of said downstream traffic information, or a receiving interval of answer information periodically transmitted by said downstream traffic information in response to question information periodically transmitted by said upstream traffic information; and
said supervisory control circuit part transmits reverse supervisory information, which is a calculated result of said error correction coefficient or a measurement result with respect to a clock signal cycle required to calculate said error correction coefficient, to said main control circuit part as a part of said upstream traffic information, and at the same time, generates a second reset pulse for initializing and restarting said main control circuit part at the time when the result of the supervision and measurement of the receiving interval of said specific supervisory signal exceeds a predetermined allowable upper limit value.

2. The electronic control apparatus as set forth in claim 1, wherein
said main control circuit part is provided with a reverse supervision abnormality totaling unit that determines whether an abnormal state of said reverse supervisory information continues, and at the same time, said supervisory control circuit part is provided with a supervision abnormality totaling unit that determines whether an abnormal state of said supervisory information continues;
said main control circuit part determines whether the value of said error correction coefficient is out of a predetermined range of allowable upper and lower limit values, based on the calculated result of said error correction coefficient or said reverse supervisory information received from said supervisory control circuit part, and generates a first reset pulse for initializing and restarting said supervisory control circuit part when it is determined that an abnormal state in which the value of said error correction coefficient is out of said predetermined range continues;
said supervisory control circuit part generates a second reset pulse for initializing and restarting said main control circuit part when it is determined that an abnormal state in which the calculated result of said error correction coefficient is out of said predetermined range continues; and
when the initialization and restart of said main control circuit part and said supervisory control circuit part are performed, abnormality occurrence history information is saved, and at the same time, in cases where an abnormal state still continues even if the initialization and restart of said main control circuit part and said supervisory control circuit part are performed, a notification of abnormality is made by an abnormality alarming device that is included at least in said first or second electric loads.

3. The electronic control apparatus as set forth in claim 1, further comprising:

a watchdog timer that supervises a first watchdog signal generated by said microprocessor; wherein said watchdog timer generates a reset pulse for initializing and restarting said main control circuit part and said supervisory control circuit part when the pulse width of said first watchdog signal is out of a predetermined range of allowable upper and lower limit values;

said main control circuit part reversely supervises and measures a receiving interval of a specific reverse supervisory signal based on said high speed clock signal in a periodic manner;

the receiving interval of said specific reverse supervisory signal is a receiving interval of said question information in said upstream traffic information, or a receiving interval of said reverse supervisory information which is the calculated result of said error correction coefficient or the measurement result with respect to a clock signal cycle required to calculate said error correction coefficient, or a receiving interval of a second watchdog signal in cases where said supervisory control circuit part generates said second watchdog signal; and said main control circuit part generates a first reset pulse for initializing and restarting said supervisory control circuit when the measurement result of the receiving interval of said specific reverse supervisory signal exceeds a predetermined allowable upper limit value.

4. The electronic control apparatus as set forth in claim 1, wherein a fluctuation region of the signal cycle of said medium speed clock signal is restricted to a relation in which the signal cycle of said medium speed clock signal is lower in speed and longer in period as compared with the signal cycle of said communication synchronization signal, and at the same time, is higher in speed and shorter in period than a serial parallel conversion cycle in which said serial parallel converters perform serial parallel conversion of a plurality of bits of upstream traffic information or downstream traffic information based on said communication synchronization signal CLK1 in a sequential manner.

5. The electronic control apparatus as set forth in claim 4, wherein said error measuring circuit is provided with a second counter that counts the frequency of generation of said medium speed clock signal, a first counter that calculates the frequency of generation of said communication synchronization signal, a coincidence determining circuit that generates a count stop command signal at the time when the count value of said second counter reaches a predetermined set threshold N2A, a second gate circuit that is formed in a count input circuit of said second counter, a first gate circuit that is formed in a count input circuit of said first counter, a measuring and storing circuit that stores the current count value of the first counter as a read-out stored value N1A at the time of generation of said count stop command signal, and an error correction coefficient calculating circuit;

said second gate circuit permits counting of said medium speed clock signal by means of said second counter at the time when said communication synchronization signal starts to be generated, and prohibits the counting operation of said second counter at the time when said count stop command signal is generated;

said first gate circuit permits counting of said communication synchronization signal by means of said first counter at the time when first counting by said second counter is started, and prohibits the counting operation of said first counter at the time when said count stop command signal is generated; and said error correction coefficient calculating circuit calculates the error correction coefficient Kn, which is the ratio of the signal cycle T2 of said medium speed clock signal to the signal cycle T1 of said communication synchronization signal, by the use of said read-out stored value N1A of said measuring and storing circuit which is the frequency of generation of said communication synchronization signal at the time when said medium speed clock signal has been generated a number of times corresponding to said set threshold N2A, according to the following equation:

$Kn = T2/T1 = N1A/(N2A-1)$.

6. The electronic control apparatus as set forth in claim 5, wherein each time said communication permission signal is generated, the current count values of said first and second counters are reset, the information stored by said measuring and storing circuit is updated in a sequential manner, and said error correction coefficient is newly calculated.

7. The electronic control apparatus as set forth in claim 4, wherein said supervisory control circuit part is provided with said communication control circuit part constructed of a hard logic circuit, said error measuring circuit including an error correction coefficient calculating circuit, and data memory in which correct answer information corresponding to said question information is stored;

said communication control circuit part transmits an input supervisory signal, which responds to the operating state of said second group of input sensors, and question information to said main control circuit part, and at the same time, receives said driving control signal for said second group of electric loads and said answer information generated by said main control circuit part, whereby it makes a comparison between said answer information and correct answer information corresponding to said question information, and generates a second reset pulse for initializing and restarting said main control circuit part in cases where said answer information is an incorrect answer.

8. The electronic control apparatus as set forth in claim 1, wherein a fluctuation region of the signal cycle of said medium speed clock signal is restricted to a relation in which the signal cycle of said medium speed clock signal is lower in speed and longer in period as compared with the signal cycle of said high speed clock signal, and at the same time, is higher in speed and shorter in period than a communication cycle of said communication synchronization signal.

9. The electronic control apparatus as set forth in claim 8, wherein said error measuring circuit is provided with a first counter that calculates the frequency of generation of said communication synchronization signal, a second counter that counts the frequency of generation of said medium speed clock signal, a coincidence determining circuit that generates a count stop command signal at the time when the count value of said first counter reaches a predetermined set threshold N1B, a first gate circuit that is formed in a count input circuit of said first counter, a second gate circuit that is formed in a count input circuit of said second counter, and a measuring and storing circuit that stores the current count value of said second counter as a read-out stored value N2B at the time of generation of said count stop command signal;

said supervisory control circuit part is further provided with an error correction coefficient calculation unit;

said first gate circuit prohibits the operation of counting said communication synchronization signal at the time of generation of said count stop command signal;

said second gate circuit permits counting of said medium speed clock signal by means of said second counter at the time when first counting by said first counter is started, and prohibits the counting operation of said second counter at the time when said count stop command signal is generated; and said error correction coefficient calculation unit calculates the error correction coefficient Kn, which is the ratio of the signal cycle T2 of said medium speed clock signal to the signal cycle T1 of said communication synchronization signal, by the use of said read-out stored value N2B of said measuring and storing circuit which is the frequency of generation of said medium speed clock signal at the time when said communication synchronization signal has been generated a number of times corresponding to said set threshold N1B, according to the following equation:

$Kn=T2/T1=(N1B-1)/N2B.$

10. The electronic control apparatus as set forth in claim 9, wherein
each time said communication permission signal is generated,
the current count values of said first and second counters are reset,
the information stored by said measuring and storing circuit is updated in a sequential manner, and
said error correction coefficient is newly calculated.

11. The electronic control apparatus as set forth in claim 8, wherein
said supervisory control circuit part is provided with said communication control circuit part that includes said error measuring circuit and an auxiliary microprocessor, and an auxiliary program memory in which a control program for arithmetically calculating said error correction coefficient and correct answer information corresponding to said question information are stored; and
said communication control circuit part transmits an input supervisory signal, which responds to the operating state of the second group of input sensors, and said question information to said main control circuit part, and at the same time, receives said driving control signal for said second group of electric loads and said answer information generated by said main control circuit part, whereby it makes a comparison between said answer information and correct answer information corresponding to said question information, and generates a second reset pulse for initializing and restarting said main control circuit part in cases where said answer information is an incorrect answer.

12. The electronic control apparatus as set forth in claim 1, wherein
said supervisory control circuit part is provided with an error correction coefficient calculation unit, and a moving average value calculation unit that calculates a moving average value;

said error measuring circuit is provided with a first counter that calculates the frequency of generation of said communication synchronization signal, a second counter that counts the frequency of generation of said medium speed clock signal, a coincidence determining circuit that generates a count stop command signal at the time when the count value of said first counter reaches a predetermined set threshold N1C, a first gate circuit that is formed in a count input circuit of said first counter, a second gate circuit that is formed in a count input circuit of said second counter, and a measuring and storing circuit that stores the current count value of said second counter as a read-out stored value N2C at the time of generation of said count stop command signal;

said first gate circuit prohibits the operation of counting said communication synchronization signal at the time of generation of said count stop command signal;

said second gate circuit permits counting of said medium speed clock signal by means of said second counter at the time when first counting by said first counter is started, and prohibits the counting operation of said second counter at the time when said count stop command signal is generated; and said error correction coefficient calculation unit calculates the error correction coefficient Kn, which is the ratio of the signal cycle T2 of said medium speed clock signal to the signal cycle T1 of said communication synchronization signal, by the use of said read-out stored value N2C of said measuring and storing circuit which is the frequency of generation of said medium speed clock signal at the time when said communication synchronization signal has been generated a number of times corresponding to said set threshold N1C, according to the following equation:

$Kn=T2/T1=(N1C-1)/N2C;$ each time said communication permission signal is generated,
the current count values of said first and second counters are reset, and
the information stored by said measuring and storing circuit is updated in a sequential manner; and
said moving average value calculation unit calculates an average value of a plurality of latest ones of said error correction coefficient as said moving average value.

* * * * *